US012293624B2

(12) United States Patent
Bouchelle et al.

(10) Patent No.: US 12,293,624 B2
(45) Date of Patent: May 6, 2025

(54) METHODS AND APPARATUS FOR DISPENSING SOLID ARTICLES

(71) Applicant: Parata Systems, LLC, Durham, NC (US)

(72) Inventors: Steven Paul Bouchelle, Raleigh, NC (US); Mark I. Perisich, Raleigh, NC (US); Eric X. Bonpain, Cary, NC (US); Michael Richard Floyd, Wake Forest, NC (US)

(73) Assignee: PARATA SYSTEMS, LLC, Durham, NC (US)

( * ) Notice: Subject to any disclaimer, the term of this patent is extended or adjusted under 35 U.S.C. 154(b) by 84 days.

(21) Appl. No.: 18/159,250

(22) Filed: Jan. 25, 2023

(65) Prior Publication Data

US 2023/0169817 A1 Jun. 1, 2023

Related U.S. Application Data

(62) Division of application No. 16/749,227, filed on Jan. 22, 2020, now Pat. No. 11,594,094.

(51) Int. Cl.
*G07F 11/26* (2006.01)
*A61J 7/00* (2006.01)
(Continued)

(52) U.S. Cl.
CPC ............ *G07F 11/26* (2013.01); *A61J 7/0084* (2013.01); *A61J 7/02* (2013.01); *G07F 11/42* (2013.01); *G07F 11/58* (2013.01)

(58) Field of Classification Search
CPC ......... G07F 11/26; G07F 11/42; G07F 11/58; A61J 7/0084; A61J 7/02
(Continued)

(56) References Cited

U.S. PATENT DOCUMENTS 2,190,620 A 2/1940 Milmoe et al.
2,467,995 A 4/1949 Schlechter
(Continued)

FOREIGN PATENT DOCUMENTS

CA 2428556 A1 * 11/2003 ............. G07F 11/44
CA 2888627 A1 5/2014
(Continued)

*Primary Examiner* — Rakesh Kumar
(74) *Attorney, Agent, or Firm* — Myers Bigel, P.A.

(57) ABSTRACT

A dispensing apparatus for dispensing articles includes a dispensing outlet, laterally opposed, elongate first and second guide walls defining a singulating channel therebetween, a dispensing path extending through the singulating channel to the dispensing outlet, and a drive system. The drive system includes a belt and a belt actuator operable to drive the belt. The dispensing apparatus is configured to convey articles on the belt in a dispensing direction along the dispensing path toward the dispensing outlet to be dispensed. The singulating channel is configured to singulate the articles as the articles are conveyed along the dispensing path and through the singulating channel toward the dispensing outlet to be dispensed. The first guide wall extends laterally across the singulating channel at an oblique angle to vertical to overhang at least a portion of the singulating channel and engage articles conveyed along the singulating channel.

19 Claims, 15 Drawing Sheets

(51) Int. Cl.

| | |
|---|---|
| ***A61J 7/02*** | (2006.01) |
| ***G07F 11/42*** | (2006.01) |
| ***G07F 11/58*** | (2006.01) |

(58) Field of Classification Search

USPC ......... 221/174, 156, 267; 250/215; 324/555, 324/556; 211/1, 7, 10

See application file for complete search history.

(56) References Cited

U.S. PATENT DOCUMENTS 2,671,098 A * 3/1954 Pavia ........................ C11B 1/08 554/8
2,701,671 A 2/1955 Lakso et al.
3,319,827 A 5/1967 Englesson
3,387,695 A 6/1968 Ralph
3,710,919 A 1/1973 Maters
3,730,386 A 5/1973 Monsees
3,767,027 A 10/1973 Pund et al.
3,777,769 A 12/1973 Ueno
3,837,139 A 9/1974 Rosenberg
3,937,455 A 2/1976 Hauser
4,060,111 A 11/1977 Burks
4,205,743 A 6/1980 Whitmore
4,247,019 A 1/1981 Bernard
4,623,059 A 11/1986 Agnew
4,651,982 A 3/1987 Martin
4,677,283 A 6/1987 Lewis
4,708,234 A 11/1987 Born et al.
4,744,492 A 5/1988 Hackmann et al.
4,815,580 A 3/1989 Schanz et al.
4,909,375 A 3/1990 Cotic et al.
4,953,749 A * 9/1990 Kubota .............. B65G 47/1407 221/202
5,110,008 A 5/1992 Moulding et al.
5,111,926 A 5/1992 Long
5,201,508 A 4/1993 Kuo
5,337,919 A 8/1994 Spaulding et al.
5,385,434 A * 1/1995 Quinn .................... B65G 47/24 406/73
5,562,232 A * 10/1996 Pearson ................ A61J 7/0084 221/211
5,605,217 A 2/1997 Risley et al.
5,664,662 A 9/1997 Wilson et al.
RE35,743 E * 3/1998 Pearson .................. G07F 9/002 221/9
6,024,033 A 2/2000 Kinkead et al.
6,098,838 A * 8/2000 Saho .................... H05K 13/028 221/163
6,170,699 B1 1/2001 Kim
6,189,733 B1 * 2/2001 Nemoto ............... H05K 13/028 221/277
6,343,711 B1 2/2002 Coughlin
6,568,151 B2 5/2003 Buckley et al.
6,596,233 B2 * 7/2003 Berge ........................ F25C 5/20 422/292
6,631,799 B2 10/2003 Samson
6,631,826 B2 10/2003 Pollard et al.
6,758,323 B2 7/2004 Costanzo
6,971,541 B2 12/2005 Williams et al.
6,971,544 B2 12/2005 Williams et al.
6,974,049 B2 12/2005 Williams et al.
6,974,050 B2 12/2005 Williams et al.
6,997,341 B2 * 2/2006 Pearson .................... A61J 7/02 221/13
7,014,063 B2 3/2006 Shows et al.
7,118,006 B2 10/2006 Williams et al.
7,216,776 B2 5/2007 Gelardi
7,263,411 B2 8/2007 Shows et al.
7,269,476 B2 9/2007 Ratnakar
7,275,353 B2 10/2007 Williams et al.
7,331,442 B2 * 2/2008 Saito .................. H05K 13/0421 406/28
7,344,049 B2 * 3/2008 Daniels ................... G07F 13/10 221/92
7,565,782 B2 7/2009 Williams et al.
7,565,784 B2 7/2009 Williams et al.
7,596,932 B2 10/2009 Sink et al.
7,795,556 B1 9/2010 Dean
7,832,591 B2 * 11/2010 Karwacki, Jr. ..... G07F 17/0092 700/231
7,837,061 B2 11/2010 Dummer et al.
7,866,506 B2 1/2011 Daniels et al.
7,870,973 B2 1/2011 Michelli et al.
7,878,366 B2 2/2011 Cicognani
7,905,372 B2 3/2011 Williams et al.
7,949,427 B2 5/2011 Michelli et al.
7,988,017 B2 * 8/2011 Kulberg ............... B65G 1/1373 221/163
7,988,404 B2 8/2011 Williams et al.
8,020,724 B2 9/2011 Remis et al.
8,054,086 B2 * 11/2011 Rivenbark, Jr. ...... G07F 11/165 211/1
8,220,657 B2 7/2012 Cicognani
8,240,506 B2 8/2012 Kulberg et al.
8,244,401 B2 8/2012 Michelli et al.
8,261,936 B2 9/2012 Dumond et al.
8,348,094 B2 1/2013 Remis et al.
8,464,901 B2 6/2013 Karwacki et al.
8,467,899 B2 6/2013 Karwacki et al.
8,499,967 B2 8/2013 Michelli
8,827,113 B2 9/2014 Michelli et al.
9,296,545 B2 3/2016 Daniels et al.
9,499,328 B2 11/2016 Daniels et al.
10,207,857 B2 2/2019 Daniels et al.
10,457,473 B2 10/2019 Daniels et al.
2002/0179628 A1 12/2002 Geltser et al.
2003/0015555 A1 * 1/2003 Pollard ..................... A61J 7/02 222/278
2004/0004085 A1 * 1/2004 Williams ................ G07F 11/62 221/278
2006/0006190 A1 * 1/2006 Janet ................... G07F 17/0092 221/211
2006/0241807 A1 * 10/2006 Daniels ................... G07F 11/62 700/235
2007/0194034 A1 8/2007 Vasiadis
2008/0110555 A1 5/2008 Bouchelle et al.
2008/0283549 A1 * 11/2008 Dummer ............. G07F 17/0092 221/174
2008/0283734 A1 * 11/2008 Michelli ................. G07F 11/44 250/215
2009/0043421 A1 2/2009 Parrish et al.
2009/0057328 A1 3/2009 Nitesh
2009/0294464 A1 12/2009 Michelli et al.
2010/0006584 A1 * 1/2010 Michelli ............... G07F 11/165 221/278
2010/0096399 A1 4/2010 Nitesh
2010/0100237 A1 4/2010 Nitesh
2010/0264158 A1 10/2010 Van et al.
2012/0085775 A1 4/2012 Czarnek
2013/0144431 A1 6/2013 Tidhar et al.
2013/0256097 A1 10/2013 Koike et al.
2013/0284755 A1 10/2013 Yuyama et al.
2013/0304255 A1 11/2013 Ratnakar
2014/0138398 A1 * 5/2014 Daniels .................. B65D 83/04 221/202
2016/0167866 A1 6/2016 Omura
2016/0287480 A1 10/2016 Hancock et al.
2017/0036845 A1 * 2/2017 Daniels ................... G07F 11/62
2019/0092500 A1 3/2019 Yesudasan
2019/0144195 A1 5/2019 Daniels et al.
2021/0225118 A1 * 7/2021 Bouchelle ............... G07F 11/42

FOREIGN PATENT DOCUMENTS

EP 1884489 A1 2/2008
EP 2072427 A1 6/2009
FR 2595083 A1 9/1987
WO 2014081635 A2 5/2014

* cited by examiner

METHODS AND APPARATUS FOR DISPENSING SOLID ARTICLES

RELATED APPLICATION

The present application is a divisional of and claims priority from U.S. patent application Ser. No. 16/749,227, filed Jan. 22, 2020, the disclosure of which is incorporated by reference herein.

FIELD OF THE INVENTION e present invention is directed generally to the dispensing of solid articles and, more specifically, is directed to the automated dispensing of solid articles, such as solid pharmaceutical articles.

BACKGROUND OF THE INVENTION

Pharmacy generally began with the compounding of medicines which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. For example, U.S. Pat. No. 6,971,541 to Williams et al. describes an automated system for dispensing pharmaceuticals using dispensing bins. Each dispensing bin includes a hopper in which tablets are stored and a dispensing channel fluidly connecting the hopper to a dispensing outlet. Forward and reverse air flows are used to selectively convey the tablets through the dispensing channel in each of a dispensing direction (toward the outlet) and a reverse direction (toward the hopper). A counting sensor is positioned proximate the outlet of the dispensing channel and used to detect tablets passing the sensor in order to maintain a count of the tablets dispensed.

SUMMARY OF THE INVENTION

According to some embodiments, a dispensing apparatus for dispensing articles includes a dispensing outlet, laterally opposed, elongate first and second guide walls defining a singulating channel therebetween, a dispensing path extending through the singulating channel to the dispensing outlet, and a drive system. The drive system includes a belt and a belt actuator operable to drive the belt. The dispensing apparatus is configured to convey articles on the belt in a dispensing direction along the dispensing path toward the dispensing outlet to be dispensed. The singulating channel is configured to singulate the articles as the articles are conveyed along the dispensing path and through the singulating channel toward the dispensing outlet to be dispensed. The first guide wall extends laterally across the singulating channel at an oblique angle to vertical to overhang at least a portion of the singulating channel and engage articles conveyed along the singulating channel.

In some embodiments, the oblique angle is in the range of from about 8 to 12 degrees.

In some embodiments, the first guide wall is longitudinally nonlinear, and the singulating channel is longitudinally nonlinear.

In some embodiments, the first guide wall is longitudinally arcuate, and the singulating channel is longitudinally arcuate.

In some embodiments, the second guide wall extends laterally away from the first guide wall at a second oblique angle to vertical.

According to some embodiments, the second oblique angle is in the range of from about 43 to 47 degrees.

According to some embodiments, at least one of the first and second guide walls is movable relative to the other to selectively adjust a width dimension of the singulating channel.

In some embodiments, the dispensing apparatus includes a first baffle including the first guide wall, and a second baffle including the second guide wall.

According to some embodiments, the dispensing apparatus includes a deflector nub that projects laterally inwardly from the first guide wall or the second guide wall.

In some embodiments, the singulating channel includes the singulating section and a receiving section. The singulating section is located between the receiving section and the dispensing outlet. The receiving section is wider than the singulating section.

According to some embodiments, the dispensing apparatus includes a singulating gate system including a singulating gate member positioned over the belt and configured to define a singulating opening along the singulating channel or at an outlet end of the singulating channel.

In some embodiments, the singulating gate member, the first guide wall, and the second guide wall collectively define the singulating opening.

In some embodiments, the singulating gate member is movable relative to the belt to selectively adjust a height of the singulating opening. At least one of the first and second guide walls is movable relative to the other to selectively adjust a width dimension of the singulating opening.

According to some embodiments, the dispensing apparatus includes a housing including: a hopper chamber to hold the articles; the dispensing outlet; the singulating channel; and the dispensing path. The dispensing path extends between the hopper chamber and the dispensing outlet and through the singulating channel. The dispensing apparatus is configured such that articles disposed in the hopper chamber are directed onto the belt and the belt, when driven by the belt actuator, conveys the articles received from the hopper chamber in the dispensing direction along the dispensing path toward the dispensing outlet to be dispensed.

According to some embodiments, the dispensing apparatus is operable to selectively drive the belt in a reverse direction to convey the articles along the dispensing path away from the dispensing outlet.

In some embodiments, the dispensing apparatus includes a singulation adjustment system including an article sizing member that is: movable to clamp a sizing article to thereby set a dimension of the singulating channel corresponding to a dimension of the sizing article; and thereafter movable to release the sizing article, whereupon the set dimension of the singulating channel is retained.

According to embodiments of the invention, a method for dispensing articles includes providing a dispensing apparatus including: a dispensing outlet; laterally opposed, elongate first and second guide walls defining a singulating channel therebetween; a dispensing path extending through the singulating channel to the dispensing outlet; and a drive system. The drive system includes a belt and a belt actuator operable to drive the belt. The method further includes: dispensing articles, including driving the belt using the belt actuator to convey articles on the belt in a dispensing direction along the dispensing path toward the dispensing outlet to be dispensed. The singulating channel singulates the articles as the articles are conveyed along the dispensing path and through the singulating channel toward the dispensing outlet to be dispensed. The first guide wall extends laterally across the singulating channel at an oblique angle to vertical to overhang at least a portion of the singulating channel and engages articles conveyed along the singulating channel.

According to embodiments of the invention, a dispensing apparatus for dispensing articles includes: a dispensing outlet; a dispensing path extending to the dispensing outlet; a singulating system defining a singulating passage; and a drive system configured to convey articles in a dispensing direction along the dispensing path through the singulating passage toward the dispensing outlet to be dispensed. The singulating passage is configured to singulate the articles as the articles are conveyed through the singulating passage toward the dispensing outlet. The singulating system includes a singulation adjustment system to selectively adjust a dimension of the singulating passage. The singulation adjustment system includes an article sizing member that is: movable to clamp a sizing article to thereby set a dimension of the singulating passage corresponding to a dimension of the sizing article; and thereafter movable to release the sizing article, whereupon the set dimension of the singulating passage is retained.

In some embodiments, the singulation adjustment system includes an article receiving slot, and the article sizing member is movable to clamp the sizing article in the article receiving slot.

According to some embodiments, the singulation adjustment system further includes a second article sizing member that is: movable to clamp the first sizing article or a second sizing article to thereby set a second dimension of the singulating passage corresponding to a second dimension of the first or second sizing article; and thereafter movable to release the first or second sizing article, whereupon the second set dimension of the singulating passage is retained.

In some embodiments, the first set dimension of the singulating passage is a width dimension of the singulating passage, and the second set dimension of the singulating passage is a height dimension of the singulating passage.

According to some embodiments, the singulating system includes laterally opposed, elongate first and second guide walls defining a singulating channel therebetween. The singulating system further includes gate member positioned over the singulating channel to define a gate opening. The singulation adjustment system is configured such that moving the first article sizing member to clamp the first sizing article moves at least one of the first and second guide walls to thereby set a width of the singulating channel. The singulation adjustment system is configured such that moving the second article sizing member to clamp the first or second sizing article moves the gate member to set a height of the gate opening.

According to method embodiments, a method for dispensing articles includes providing a dispensing apparatus including: a dispensing outlet; a dispensing path extending to the dispensing outlet; a singulating system defining a singulating passage; and a drive system configured to convey articles in a dispensing direction along the dispensing path through the singulating passage toward the dispensing outlet to be dispensed. The singulating passage is configured to singulate the articles as the articles are conveyed through the singulating passage toward the dispensing outlet. The singulating system includes a singulation adjustment system to selectively adjust a dimension of the singulating passage. The singulation adjustment system includes an article sizing member that is: movable to clamp a sizing article to thereby set a dimension of the singulating passage corresponding to a dimension of the sizing article; and thereafter movable to release the sizing article, whereupon the set dimension of the singulating passage is retained. The method further includes setting the dimension of the singulating passage by: moving the article sizing member to clamp the sizing article; thereafter moving the article sizing member to release the sizing article; and thereafter removing the sizing article. The method includes thereafter dispensing articles in the dispensing direction along the dispensing path toward the dispensing outlet.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
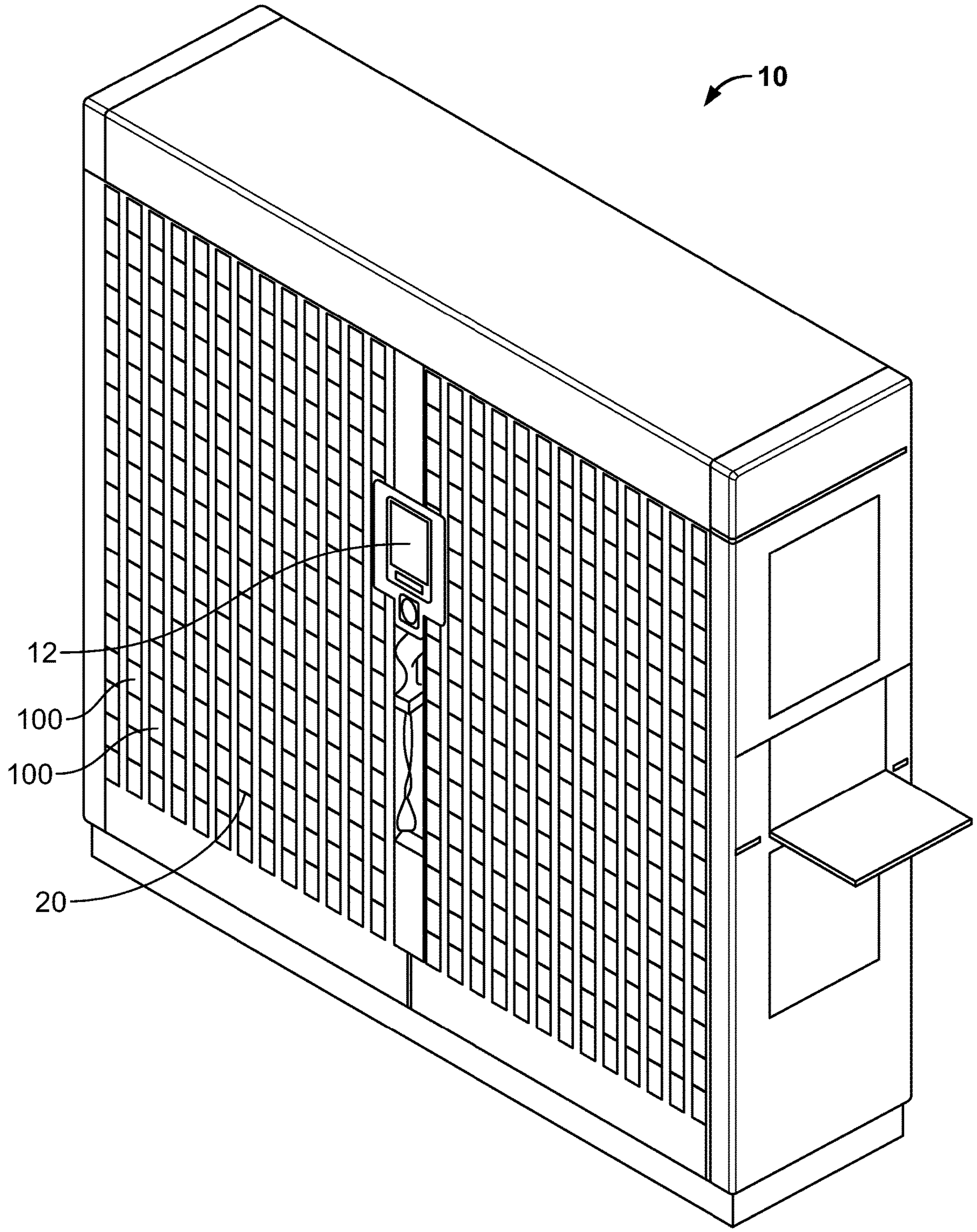
FIG. 1 is a front perspective view of a pharmaceutical tablet dispensing system according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being “coupled” or “connected” to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "automatically" means that the operation is substantially, and may be entirely, carried out without human or manual input, and can be programmatically directed or carried out.

The term "programmatically" refers to operations directed and/or primarily carried out electronically by computer program modules, code and/or instructions.

The term "electronically" includes both wireless and wired connections between components.

The term "monolithic" means an object that is a single, unitary piece formed or composed of a material without joints or seams.

In accordance with embodiments of the present invention, apparatus and methods are provided for dispensing solid articles. According to some embodiments, the solid articles are solid pharmaceutical articles. In particular, such methods and apparatus may be used to dispense pharmaceutical pills or tablets.

Figure 2:
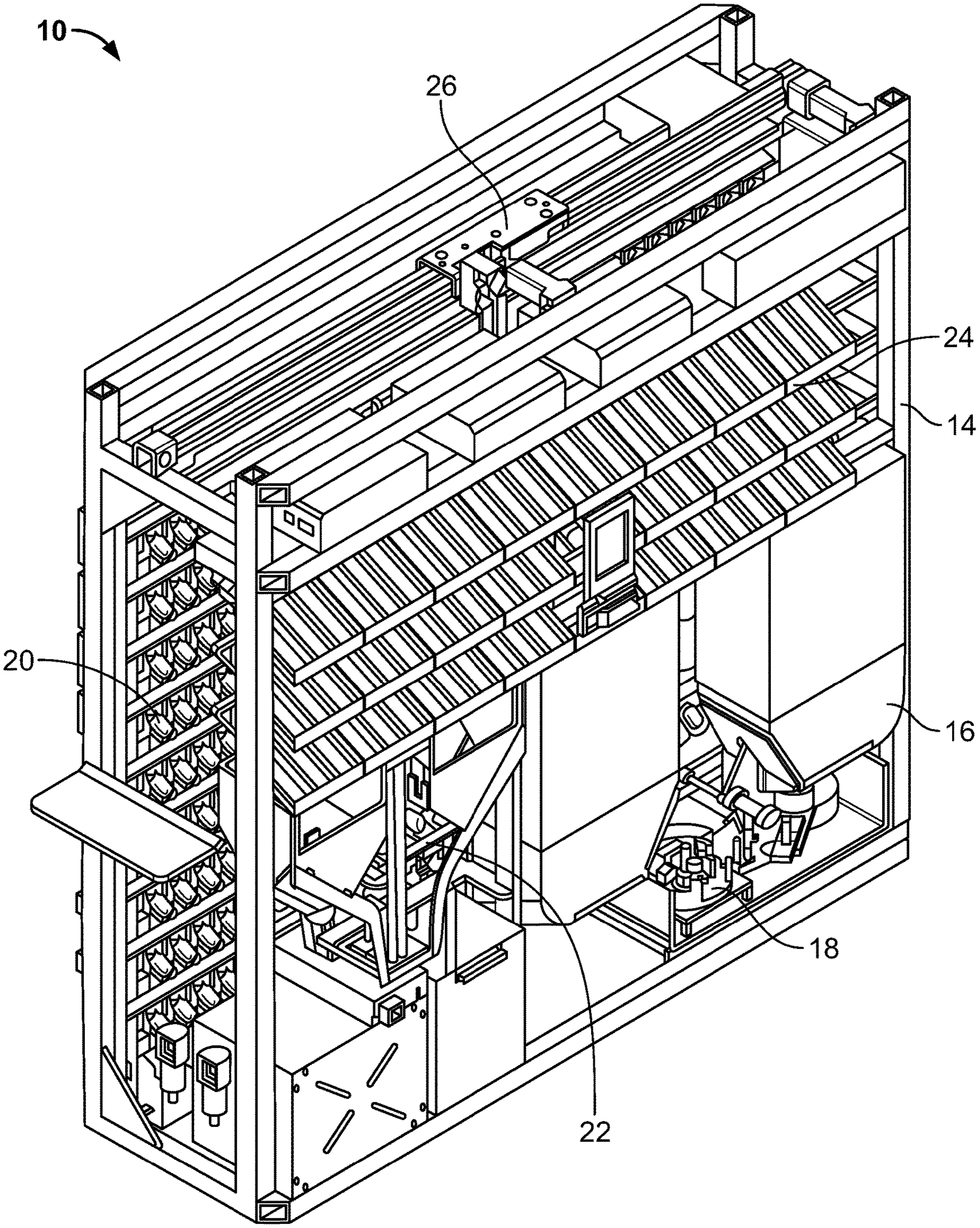
FIG. 2 is a cutaway, rear perspective view of the tablet dispensing system of FIG. 1.

A dispensing system according to embodiments of the present invention and that can carry out the foregoing methods is illustrated in FIGS. 1 and 2 and designated broadly therein at. The dispensing system 10 includes a support frame 14 for the mounting of its various components. Those skilled in this art will recognize that the frame 14 illustrated herein is exemplary and can take many configurations that would be suitable for use with the present invention. The frame 14 provides a strong, rigid foundation to which other components can be attached at desired locations, and other frame forms able to serve this purpose may also be acceptable for use with this invention.

The system 10 generally includes as operative stations a controller (represented herein by a graphical user interface 12), a container dispensing station 16, a labeling station 18, a tablet dispensing station 20, a closure station 22, and an offloading station 24. In the illustrated embodiment, containers, tablets and closures are moved between these stations with a dispensing carrier 26; however, in some embodiments, multiple carriers are employed. The dispensing carrier 26 has the capability of moving the container to designated locations within the frame 14. Except as discussed herein with regard to the dispensing station 20, each of the operative stations and the conveying devices may be of any suitable construction such as those described in detail in U.S. Patent Publication No. 2008/0110555 and U.S. Pat. Nos. 6,971,541; 7,344,049; 7,596,932; and 8,261,936, the disclosures of which are hereby incorporated herein in their entireties.

The controller 12 controls the operation of the remainder of the system 10. The controller 12 may programmatically and automatically or semi-automatically control the system 10 as described herein. In some embodiments, the controller 12 will be operatively connected with an external device, such as a personal or mainframe computer, that provides input information regarding prescriptions. In other embodiments, the controller 12 may be a stand-alone computer that directly receives manual input from a pharmacist or other operator. The controller 12 may be distributed with a portion thereof mounted on each bin as described hereinbelow. As used herein, the controller 12 may refer to a central controller and/or a dedicated controller onboard an associated bin. An exemplary controller is a conventional microprocessor-based personal computer.

In operation, the controller 12 signals the container dispensing station 16 that a container of a specified size is desired. In response, the container dispensing station 16 delivers a container to the labeling station 18. The labeling station 18 includes a printer that is controlled by the controller 12. The printer prints and presents an adhesive label that is affixed to the container. The carrier 26 moves the labeled container to the appropriate bin 100 for dispensing of tablets in the container.

Filling of labeled containers with tablets is carried out by the tablet dispensing station 20. The tablet dispensing station 20 comprises a plurality of tablet dispensing bin assemblies or bins 100 (described in more detail below), each of which holds a bulk supply of individual tablets (typically the bins 100 will hold different tablets). The dispensing bins 100, which may be substantially identical in size and configuration, are organized in an array mounted on the rails of the frame 14. Each dispensing bin 100 has a dispensing passage or channel 140 (FIGS. 5 and 12) that communicates with a dispensing portal or outlet 119 that faces generally in the same direction to create an access region for the dispensing carrier 26. The identity of the tablets in each bin is known by the controller 12, which can direct the dispensing carrier 26 to transport the container to the proper bin 100. In some embodiments, the bins 100 may be labeled with a bar code, RFID tag or other indicia to allow the dispensing carrier 26 to confirm that it has arrived at the proper bin 100.

The dispensing bins 100 are configured to singulate, count, and dispense the tablets contained therein, with the operation of the bins 100 and the counting of the tablets being controlled by the controller 12. Some embodiments may employ the controller 12 as the device which monitors the locations and contents of the bins 100; others may employ the controller 12 to monitor the locations of the bins, with the bins 100 including indicia (such as a bar code or electronic transmitter) to identify the contents to the controller 12. In still other embodiments, the bins 100 may generate and provide location and content information to the controller 12, with the result that the bins 100 may be moved to different positions on the frame 14 without the need for manual modification of the controller 12 (i.e., the bins 100 will update the controller 12 automatically).

The motor 128, the sensor 134A, and/or the photoemitter 134B may be integral with the bin 100 or may be mounted on a structure that is separate or separable from the bin 100.

After the container is desirably filled by the tablet dispensing station 20, the dispensing carrier 26 moves the filled container to the closure dispensing station 22. The closure dispensing station 22 may house a bulk supply of closures and dispense and secure them onto a filled container. The dispensing carrier 26 then moves to the closed container, grasps it, and moves it to the offloading station 24.

Turning to the bins 100 in more detail, an exemplary bin 100 is shown in more detail in FIGS. 3-15. The bin 100 includes a housing 110, a drive system 120, and a control system 130. The control system 130 may include an onboard controller 132.

The bin 100 may also include an interface module (not shown) to enable communications and provide power to the bin 100. The interface module may operatively engage one or more mating connectors in the frame 14 when the bin 100 is mounted in the frame 14.

Figure 3:
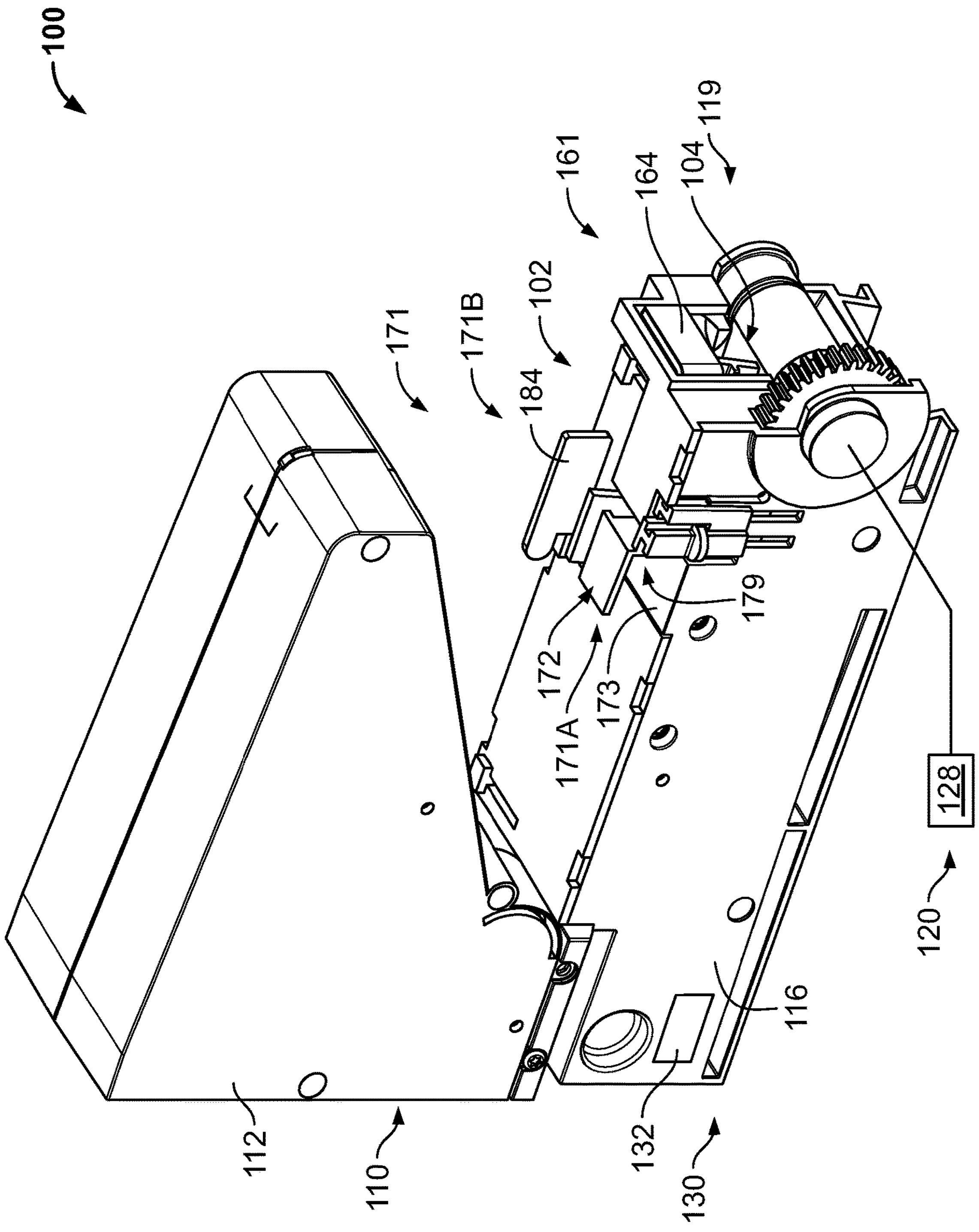
FIG. 3 is a front perspective view of a dispensing bin according to some embodiments and forming a part of the tablet dispensing system of FIG. 1.
Figure 5:
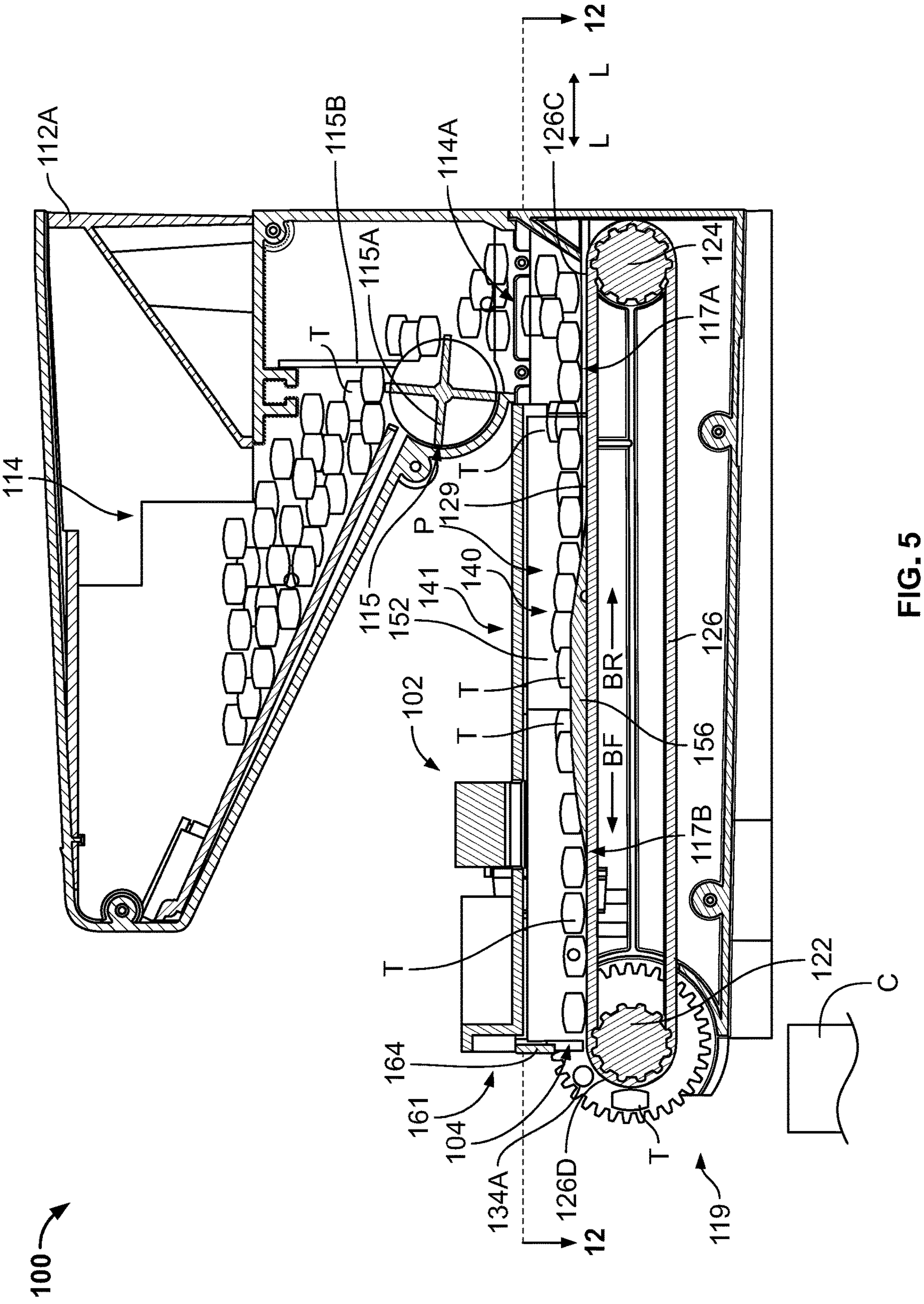
FIG. 5 is a cross-sectional view of the dispensing bin of FIG. 3 taken along the line 5-5 of FIG. 4.

Referring to FIGS. 3 and 5, the housing 110 includes a hopper portion 112 and a dispensing portion 116. The housing 110 may further include a nozzle (not shown) at the exit end of the housing 110 (i.e., opposite the hopper portion 112) and the nozzle may define the dispensing outlet 119. The hopper portion 112 defines a hopper chamber 114 that can be filled with tablets T. The hopper portion 112 includes a bottom opening 114A at the bottom of the hopper chamber 114. The bin 100 can be filled or replenished with tablets through an opening located at the upper rear portion of the bin 100. The opening is selectively accessible via a door 112A, for example, that normally resides in a closed position.

The tablets T can be dispensed one at a time into the container C (FIG. 5) through the dispensing portion 116. The bin 100 defines a tablet dispensing path from the hopper chamber 114, through the dispensing portion 116, and through the outlet 119.

The dispensing portion includes a staging region or area 117A proximate the hopper chamber opening 114A and a singulating region 117B proximate the outlet 119.

The drive system 120 includes a pair of longitudinally spaced apart rollers 122, 124, a conveyor belt 126, and an actuator (e.g., an electric motor 128). The belt 126 is an endless band encircling each of the rollers 122, 124. The motor 128 is operatively connected to the roller 122 to forcibly rotate the roller 122 and thereby drive the belt 126 around the rollers 122, 124. The belt 126 has a continuous, endless, outwardly facing engagement surface. Cooperating teeth may be provided on the inner side of the belt 126 and on the rollers 122, 124.

A belt opening 125E (FIG. 12) is defined between inner edges 154A, 158A (FIG. 15) of baffles 152, 156 (discussed below). A section of the belt 126 is positioned in or closely adjacent the belt opening so that an exposed section 129 of the belt engagement surface is exposed through the opening. The exposed section 129 extends from a take up end 126C to a release or drop off end 126D. It will be appreciated that the portion of the belt engagement surface of the belt 126 constituting the exposed section 129 varies as the belt 126 travels around the rollers 122, 124. The motor 128 is selectively operable to drive the belt 126 in each of a forward direction BF (wherein the exposed section 129 of the engagement surface travels in a direction from end 126C to end 126D) and a reverse direction BR (wherein the exposed section 129 of the engagement surface travels in a direction from end 126D to end 126C).

The belt 126 may be of any suitable type and construction. In some embodiments, the belt 126 is formed of an elastomeric material (e.g., rubber or polyurethane). The engagement surface should have sufficient frictional properties relative to the tablets T to engage and carry the tablets. Suitable materials for the belt 126 engagement surface may include polyurethane, rubber, foam polymer, or polyvinyl chloride (PVC). In some embodiments, the engagement surface is textured to enhance its grip on the tablets T. In some embodiments, the controller 132 will slow down the speed of the belt 126 near the end of the count to ensure accuracy.

Figure 4:
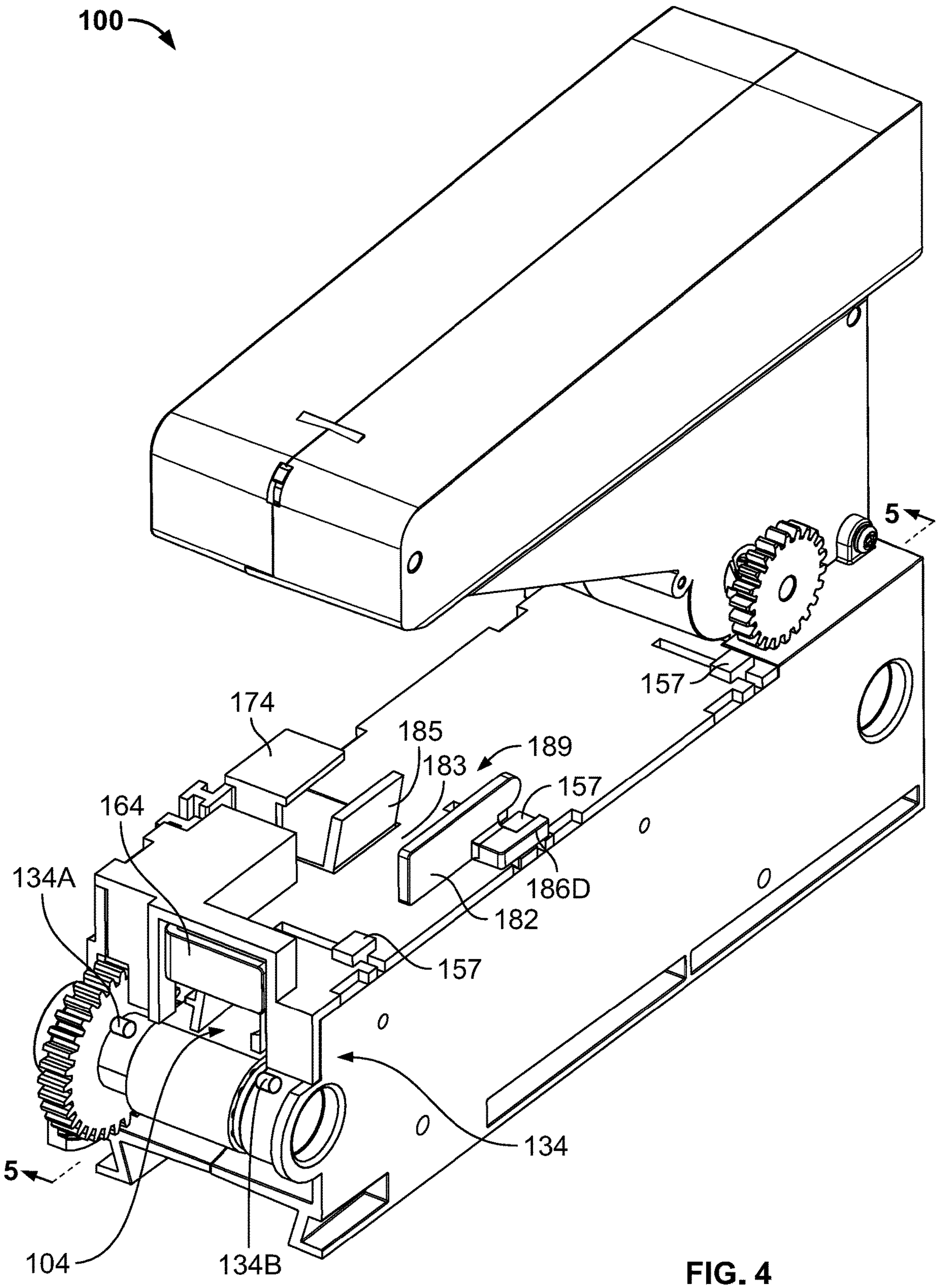
FIG. 4 is an opposing front perspective view of the dispensing bin of FIG. 3.

The control system 130 includes the onboard controller 132 and a sensor system 134. The sensor system 134 may include one or more radiation detectors (e.g., photodetectors) and radiation emitters (e.g., photoemitters). An exemplary photodetector 134A and photoemitter 134B are shown in FIGS. 4 and 5. More or fewer detectors may be provided and at different locations. For example, detectors may be located upstream, downstream (e.g., in or near the outlet 119) and/or at the belt drop off end 126D.

The photodetector(s) may be configured and positioned to detect the tablets T as they pass through the dispensing channel 140. The photodetector(s) can be configured to generate detector signals that are proportional to the light received thereby. The photoemitter(s) may be positioned and configured to generate light that is directed toward the photodetector(s) across the dispensing pathway of the tablets T. In this manner, when a tablet T interrupts the light transmitted from the photoemitter to the photodetector, the detector signal will change based on the reduced light being received at the respective photodetector. According to some embodiments, the controller 132 uses detection signals from the photodetector to count the dispensed tablets, to assess a tablet or tablets, and/or to determine conditions or performance in tablet dispensing. In some cases, the controller 132 operates the motor 128 or other devices in response to identified or determined count, conditions or performance in dispensing as determined by feedback from the sensor system 134.

The singulating system 102 includes a channeling system 141, a gate system 161, and a singulation adjustment system 171. The channeling system 141 and the gate system 161 collectively form an adjustable singulating opening 104, as discussed below.

Figure 12:
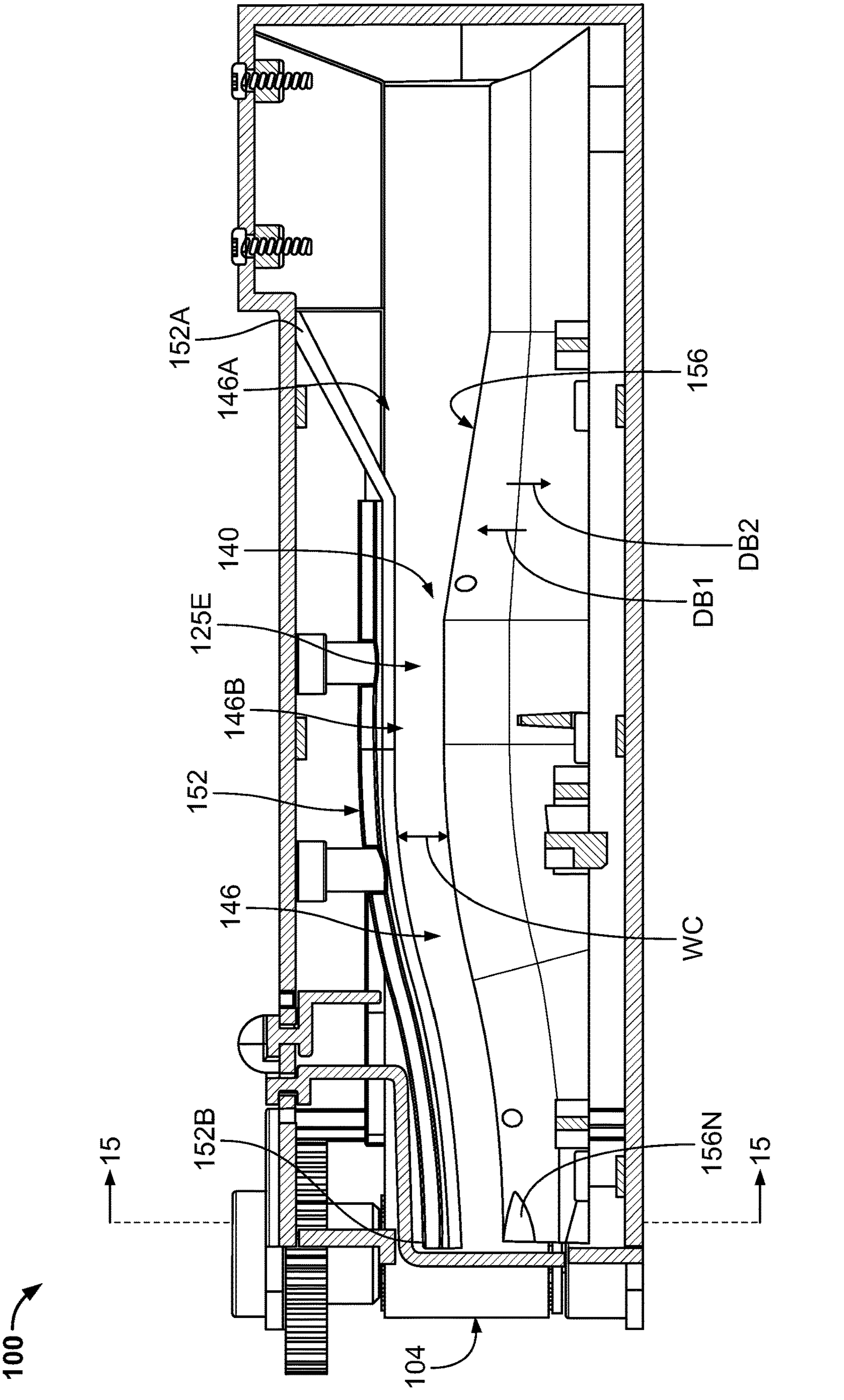
FIG. 12 is a cross-sectional view of the dispensing bin of FIG. 3 taken along the line 12-12 of FIG. 5.

The channeling system 141 includes laterally opposed singulating walls or baffles 152 and 156 (FIG. 12). The baffles 152 and 156 define a guide or singulating channel 146. The singulating channel 146 and the singulating opening 104 collectively form a dispensing channel 140. The dispensing channel 140 effectively defines a dispensing path P (FIG. 5) for the tablets T.

The second baffle 156 is movably mounted on the housing 110. The second baffle 156 includes integral mounting posts 157 (FIGS. 3 and 4) that are slidably received in corresponding integral slots 118 (FIG. 6) in the housing 110. As shown in FIG. 12, the second baffle 156 can be displaced (slid) in an inward lateral direction DB1 and in an opposing outward lateral direction DB2 as discussed below to selectively adjust a width WC (FIG. 12) of the singulating channel 146.

The second baffle 156 overlies a portion of the belt 126. The baffle 156 extends axially from a rear end 156A adjacent the hopper opening 114A to a front end 156B adjacent the singulating opening 104.

Figure 6:
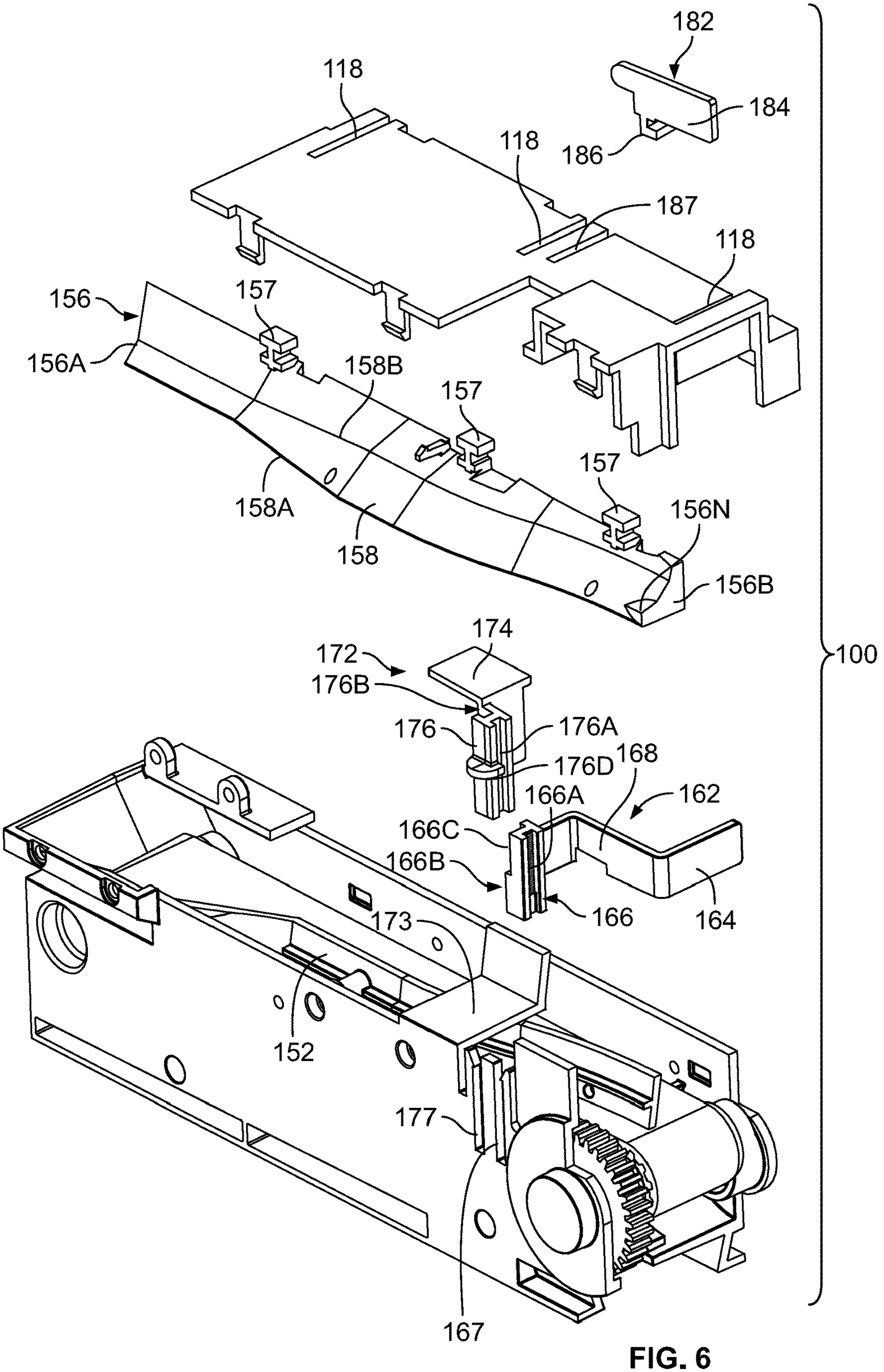
FIG. 6 is a fragmentary, exploded perspective view of the dispensing bin of FIG. 3.

As shown in FIG. 6, the second baffle 156 has a lower edge 158A proximate the belt 126 and an upper edge 158B distal from the belt 126. A second guide wall or second inner engagement surface 158 is defined between the edges 158A, 158B. According to some embodiments, the second inner engagement surface 158 is substantially smooth. The second inner engagement surface 158 has a nonlinear, arcuate axial profile (i.e., the surface 158 is longitudinally nonlinear and arcuate along its length extending from end 156A to end 156B). In some embodiments, the profile of the second inner engagement surface 158 is undulating or includes multiple bends. For example, in the illustrated embodiment, the profile has three bends.

At least a portion of the second inner engagement surface 158 is angled at an oblique angle A1 (FIG. 15) relative to vertical V-V, such that the second inner engagement surface 158 slopes downwardly and inwardly from the upper edge 158B to the lower edge 158A. The second inner engagement surface 158 is also disposed at an oblique angle to the plane B-B of the belt 126. That is, the second inner engagement surface 158 slopes outwardly or away from the singulating channel 146. According to some embodiments, the angle A1 (FIG. 15) in the range of from about 43 to 47 degrees. The angle A1 of the second inner engagement surface 158 may vary over its length. In some embodiments, at least the portion of the second inner engagement surface 158 proximate the singulating opening 104 (i.e., adjacent end 156B) is disposed at an oblique angle A1 in the range of from about 43 to 47 degrees.

Figure 15:
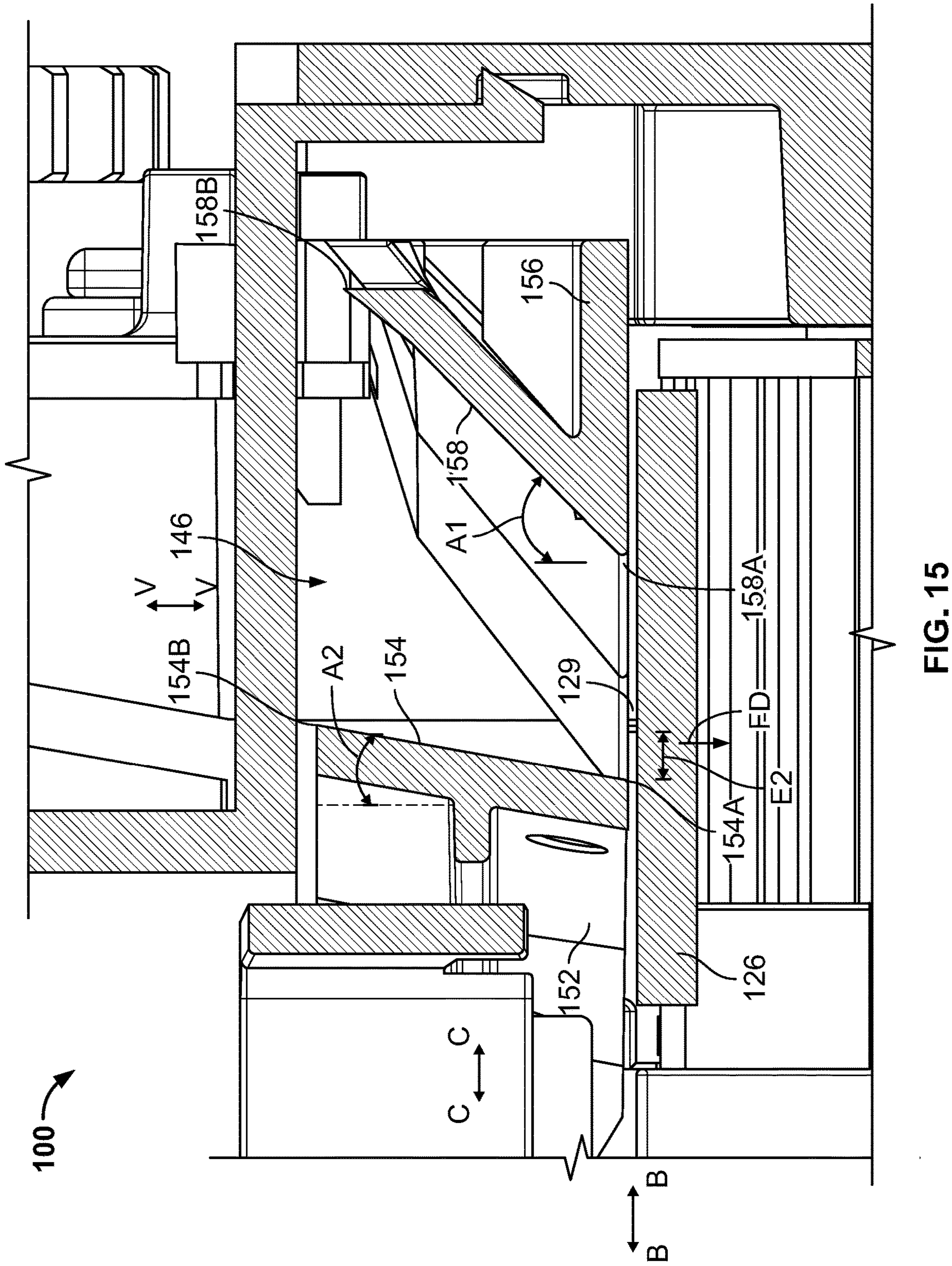
FIG. 15 is a cross-sectional view of the dispensing bin of FIG. 3 taken along the line 15-15 of FIG. 12.

In some embodiments, the first inner engagement surface 154 has a substantially rectilinear or planar profile in lateral cross-section (as shown in FIG. 15).

The second baffle 156 may further include an integral redirector feature or deflector nub 156N (FIG. 6) at the end 156B. The nub 156N projects laterally inward from the second inner engagement surface 158.

As shown in FIG. 12, the first baffle 152 is fixedly secured to the housing 110. The baffle 152 overlies a portion of the belt 126. The baffle 152 extends axially from a rear end 152A adjacent the hopper opening 114A to a front end 152B adjacent the singulating opening 104.

Figure 13:
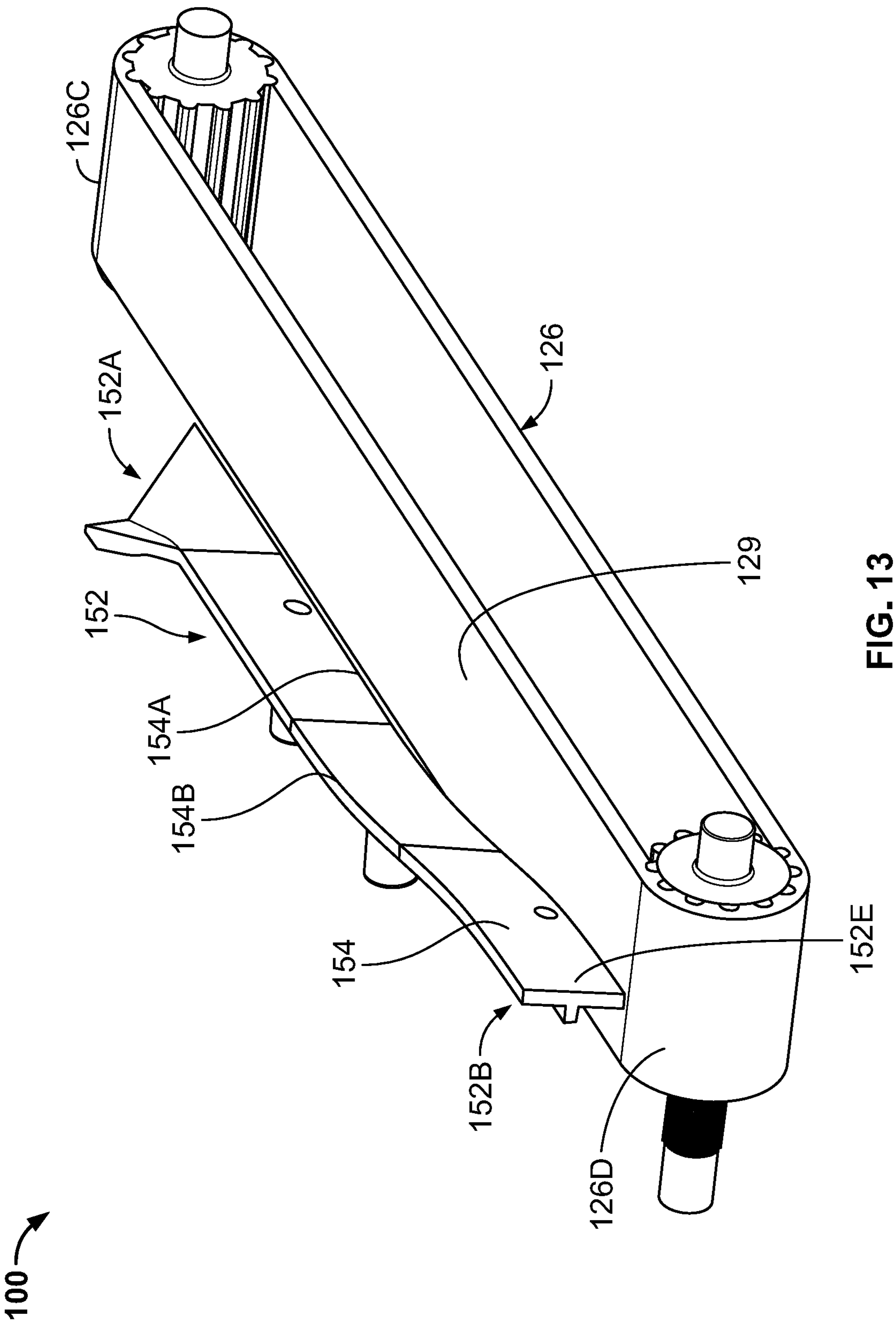
FIG. 13 is a fragmentary, front perspective view of the dispensing bin of FIG. 3.
Figure 14:
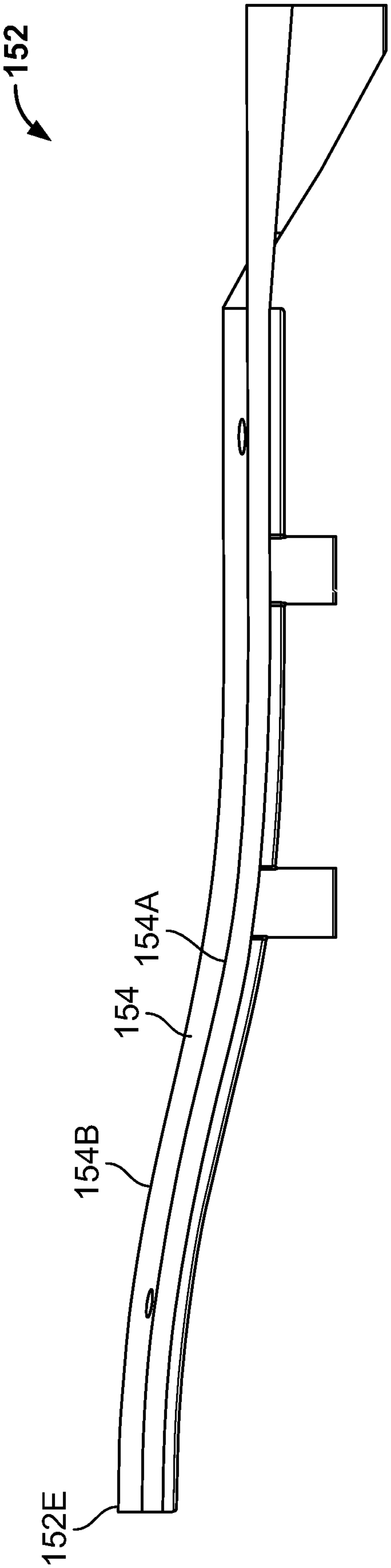
FIG. 14 is a bottom plan view of a baffle forming a part of the dispensing bin of FIG. 3.

Referring now to FIGS. 13 and 14, the first baffle 152 has a lower edge 154A proximate the belt 126 and an upper edge 154B distal from the belt 126. A first guide wall or first inner engagement surface 154 is defined between the edges 154A, 154B. According to some embodiments, the first inner engagement surface 154 is substantially smooth. The first inner engagement surface 154 has a nonlinear, arcuate axial profile (i.e., the first inner engagement surface 154 is longitudinally nonlinear and arcuate along its length extending from end 152A to end 152B). In some embodiments, the profile of the first inner engagement surface 154 is undulating or includes multiple bends. For example, in the illustrated embodiment, the profile has two bends in generally opposing directions. The lower edge 154A of the baffle 152 and the lower edge 158A of the baffle 156 define the singulating channel 146.

At least a portion of the first inner engagement surface 154 is angled or tilted at an oblique overhang angle with respect to the belt 126. The first inner engagement surface 154 is angled at an oblique angle A2 (FIG. 15) relative to vertical V-V. The first inner engagement surface 154 is also disposed at an oblique angle to the belt plane B-B. That is, the first inner engagement surface 154 slopes inwardly or toward the singulating channel 146 and the opposing first inner engagement surface 158 in a direction from its lower edge 154A to its upper edge 154B. The first inner engagement surface 154 overlies or overhangs at least a portion of the singulating channel 146. The first inner engagement surface 154 extends laterally over at least a portion of the singulating channel 146 (i.e., extends along a lateral axis C-C that is perpendicular to the longitudinal axis L-L and perpendicular to vertical V-V). The first inner engagement surface 154 faces downward (i.e., in a downward direction FD; FIG. 15). In some embodiments, the first inner engagement surface 154 faces downward toward the exposed belt surface 129.

In some embodiments, the oblique overhang angle A2 relative to vertical V-V is at least 6 degrees. In some embodiments, the overhang angle A2 is in the range of from about 8 to 12 degrees and, in some embodiments, is about 10 degrees. In some embodiments, the first inner engagement surface 154 laterally overlaps the belt surface 129 an overhang distance E2 (FIG. 15) in the range of from about 0.07 to 0.11 inch. The angle A2 of the first inner engagement surface 154 may vary over its length. In some embodiments, at least the portion of the first inner engagement surface 154 proximate the singulating opening 104 (i.e., adjacent and up to the end 152B) is disposed at an oblique angle A2 of at least about 6 degrees and, in some embodiments, in the range of from about 8 to 12 degrees.

Figure 7:
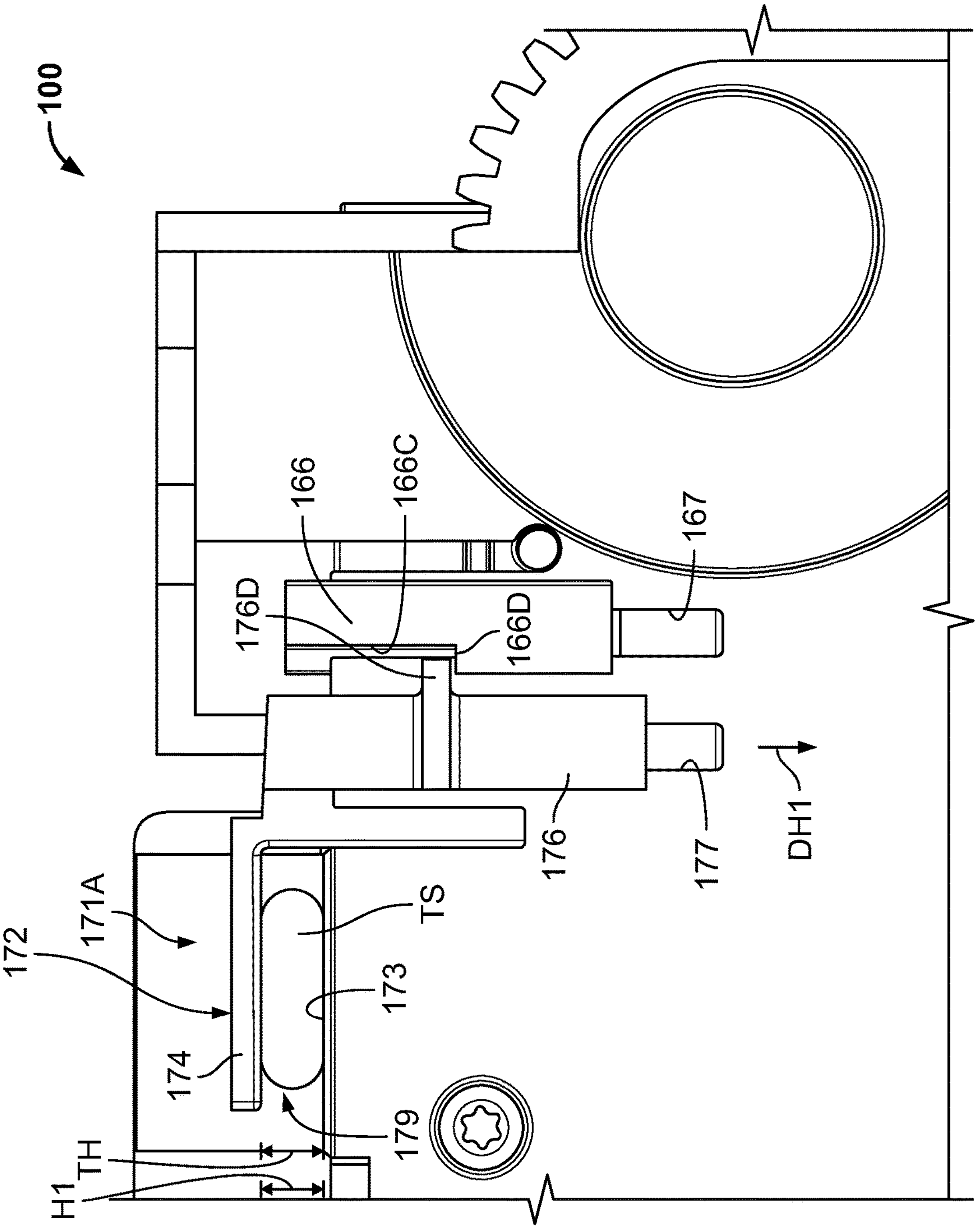
FIGS. 7 and 8 are enlarged, fragmentary, side views of the dispensing bin of FIG. 3.

Referring now to FIGS. 5 and 6, the gate system 161 includes a gate member 162 and a guide slot 167. The gate member includes a gate portion 164, a mounting portion 166, and a leg 168 connecting the portions 164, 166. Opposed, vertically extending guide grooves 166A, 166B are defined in each of the front and rear sides of the mounting portion 166. The rear side of the mounting portion 166 further includes a cutout 166C defining a rear, lower ledge 166D (FIG. 7). The guide slot 167 is defined in the housing 110 and extends substantially vertically.

As can be seen in FIGS. 6 and 7, the gate member 162 is mounted on the housing 110 such that the mounting portion 166 is slidably received in the slot 167 and the gate portion 164 is disposed at the dispensing outlet end and slightly forward of the ends 152B, 156B of the baffles 152, 156. The vertical position of the gate member 162 relative to the belt 126 and the ends 152B, 156B can be adjusted by sliding the mounting portion 166 up or down in the slot 167.

The singulation adjustment system 171 includes a height adjustment mechanism 171A and a width adjustment mechanism 171B (FIG. 3).

Referring to FIGS. 3 and 6, the height adjustment mechanism 171A includes an article height sizing member 172, a base wall 173 (forming a part of the housing 110), and a guide slot 177 (defined in the housing 110). The height sizing member 172 and the base wall 173 collectively define an article receiving seat or slot 179. The article height sizing member 172 is used to selectively adjust the height Gil of the gate portion 164, as discussed below.

The sizing member 172 includes a clamping wall 174 and an integral mounting portion 176. Opposed, vertically extending guide grooves 176A, 176B are defined in each of the front and rear sides of the mounting portion 176. An integral interlock tab 176D projects forwardly and laterally outwardly from the mounting portion 176.

The guide slot 177 is defined in the housing 110 and extends substantially vertically.

The article height sizing member 172 is mounted on the housing 110 such that the mounting portion 176 is slidably received in the slot 177 (to be raised and lowered) and the clamping wall 174 overlies the base wall 173. The sizing slot 179 is defined vertically between the clamping wall 174 and the base wall 173.

As shown in FIG. 7, the sizing member 172 is installed in its slot 177 over the gate member 162 such that the interlock tab 176D overlaps the ledge 166D. The members 162, 172 are relatively configured and arranged such that when the sizing member 172 is pushed down in its slot 177, the interlock tab 176D will seat against the ledge 166D and transfer the force to the gate member 162. The gate member 162 is thereby displaced downward in its slot 167 to the extent the sizing member 172 is displaced downward.

The gate member 162 is mounted in the slot 167 such that the gate member 162 will retain its set position in the slot 167 until deliberately moved by the user. For example, the slot 167 and the mounting portion 166 may be relatively sized and configured to provide a frictional engagement between the mounting portion 166 and the housing 110 sufficient to hold the gate member 162 in position. The cutout 166C in the mounting portion 166 provides clearance for the tab 176D such that when the sizing member 172 is pulled upward through its slot 177, the tab 176D slides up through the cutout 166C and the sizing member 172 does not change the position of the gate member 162.

Figure 8:
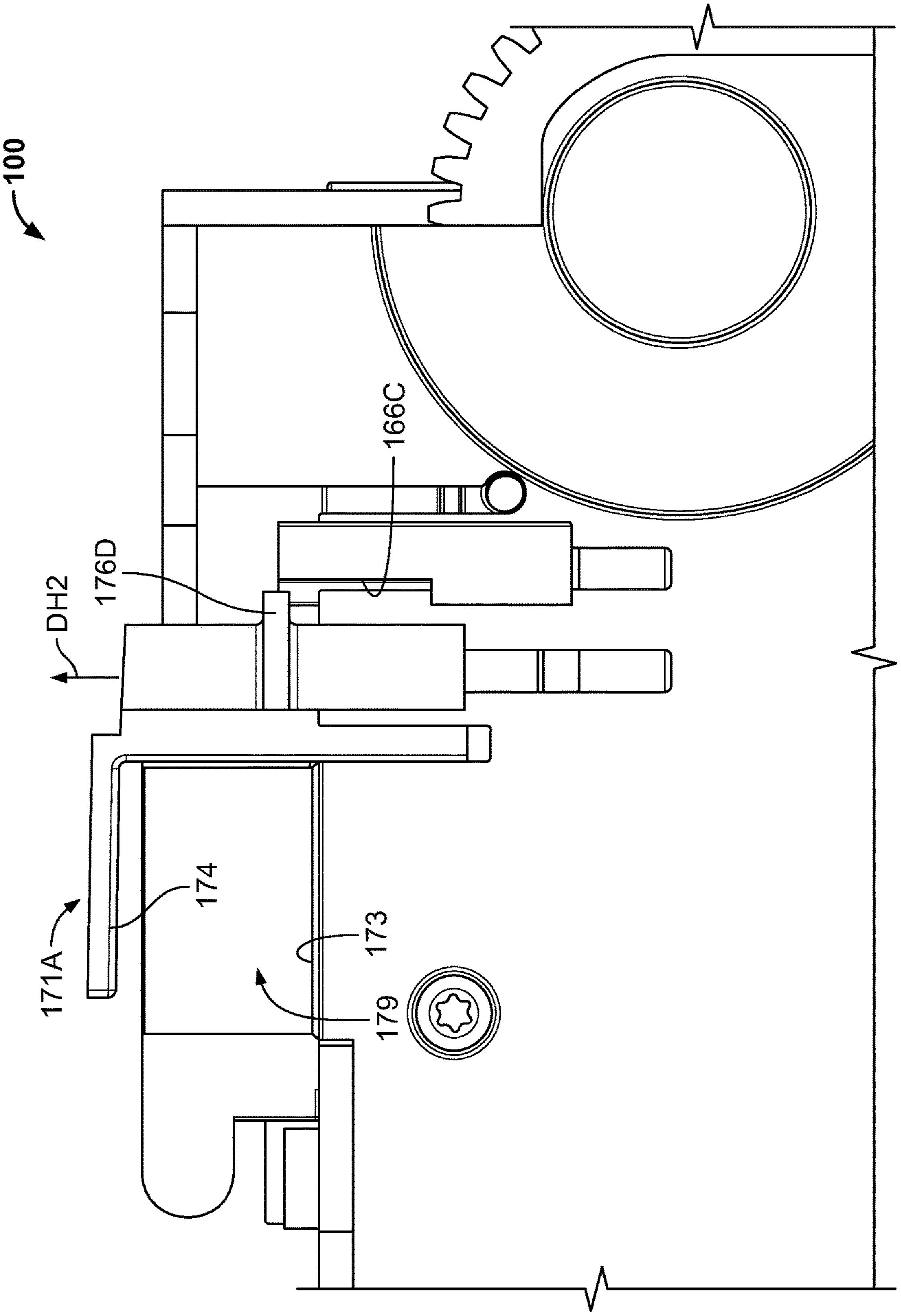

The height Gil (FIG. 9) of the gate wall 164 relative to the belt 126 can be selectively adjusted by sliding the sizing member 172 down in the slot 177. By sliding the sizing member 172 down (in direction DW1; FIG. 7), the height H1 of the sizing slot 179 (FIG. 3) is thereby reduced. Additionally, the sizing member 172 pushes the gate member 162 down (via the tab 176D) so that the gate wall 164 assumes a corresponding lower position. When the sizing member 172 is thereafter raised (in direction DH2; FIG. 8), the gate member 162 (and thereby the gate wall 164, as well) will maintain the lowest position to which it was pushed by the sizing member 172. The laterally outwardly projecting portion of the tab 176D can be used by the operator to manipulate (raise and/or lower) the sizing member 172.

As discussed below, a sizing article TS (e.g., an exemplary tablet) can be placed in the height sizing slot 179, and the sizing member 172 can then be pushed down to clamp the sizing article TS between the walls 174, 173. In doing so, the gate wall 164 is pushed into a position corresponding to the height TH (FIG. 7) of the sizing article TS. The sizing member 172 can then be slid upward (in direction DH2) through its slot 177 and the sizing article TS can then be removed, without changing the position of the gate member 162.

Figure 9:
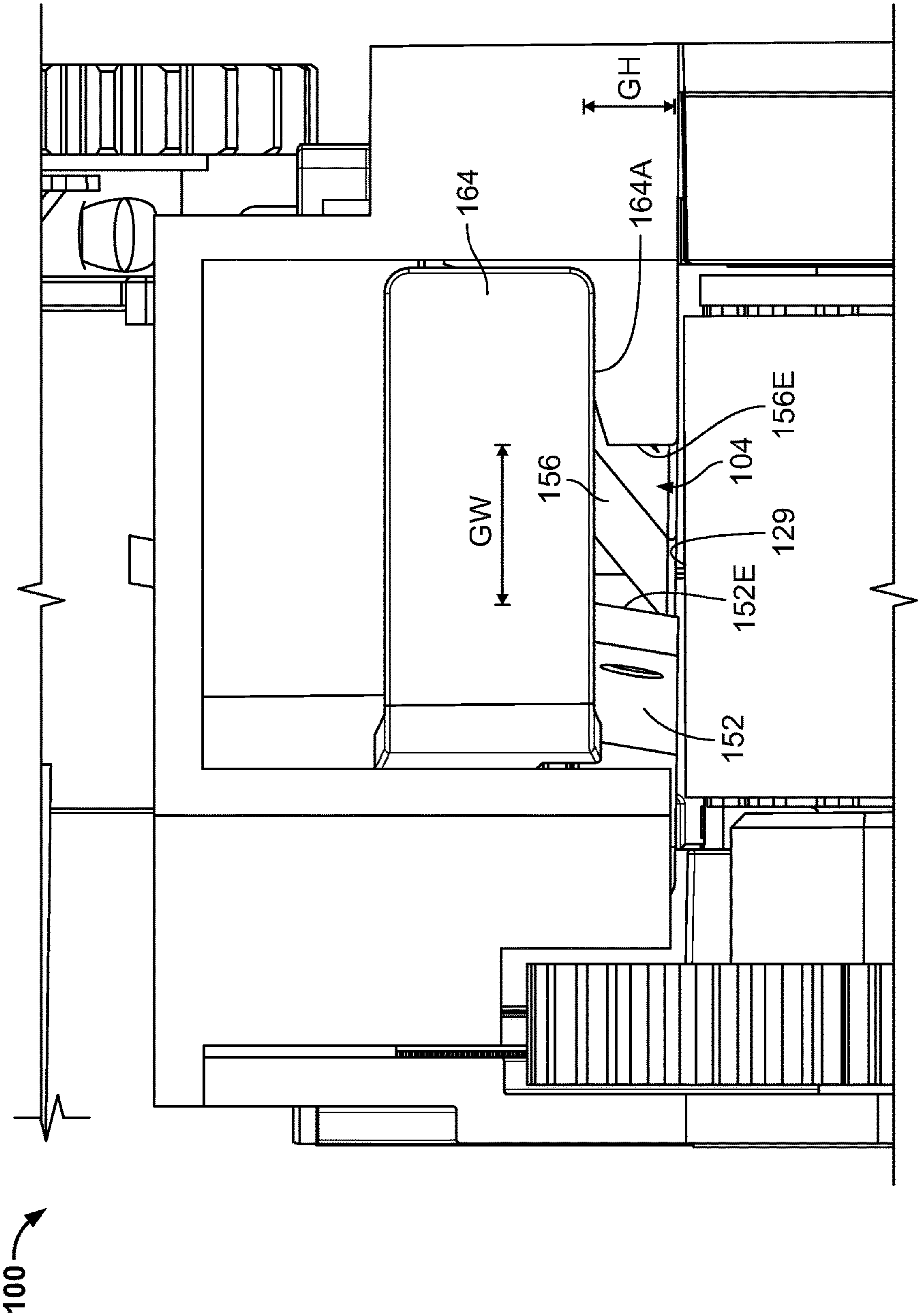
FIG. 9 is an enlarged, fragmentary, front view of the dispensing bin of FIG. 3.
Figure 10:
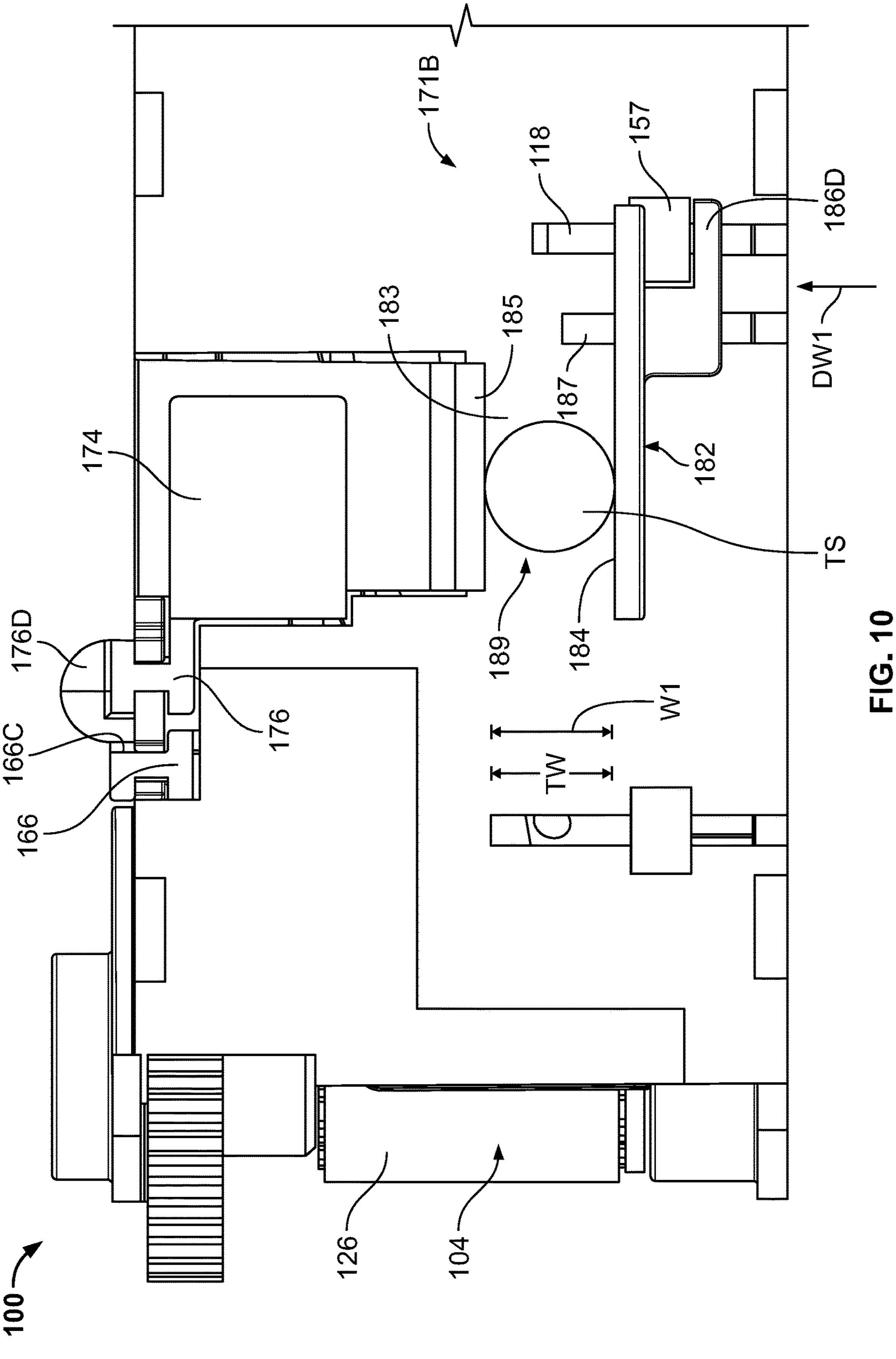
FIGS. 10 and 11 are fragmentary, top views of the dispensing bin of FIG. 3.

Referring to FIG. 10, the width adjustment mechanism 171B includes an article width sizing member 182, a base wall 183, an upstanding clamping wall 185, and a guide slot 187 (the latter three each forming a part of the housing 110). The width sizing member 182 and the base wall 183 collectively define an article receiving seat or slot 189. The article width sizing member 182 is used to selectively adjust the width GW (FIG. 9) of the singulating channel 146, as discussed below.

The guide slot 187 is defined in the housing 110 and extends substantially horizontally and laterally.

Figure 11:
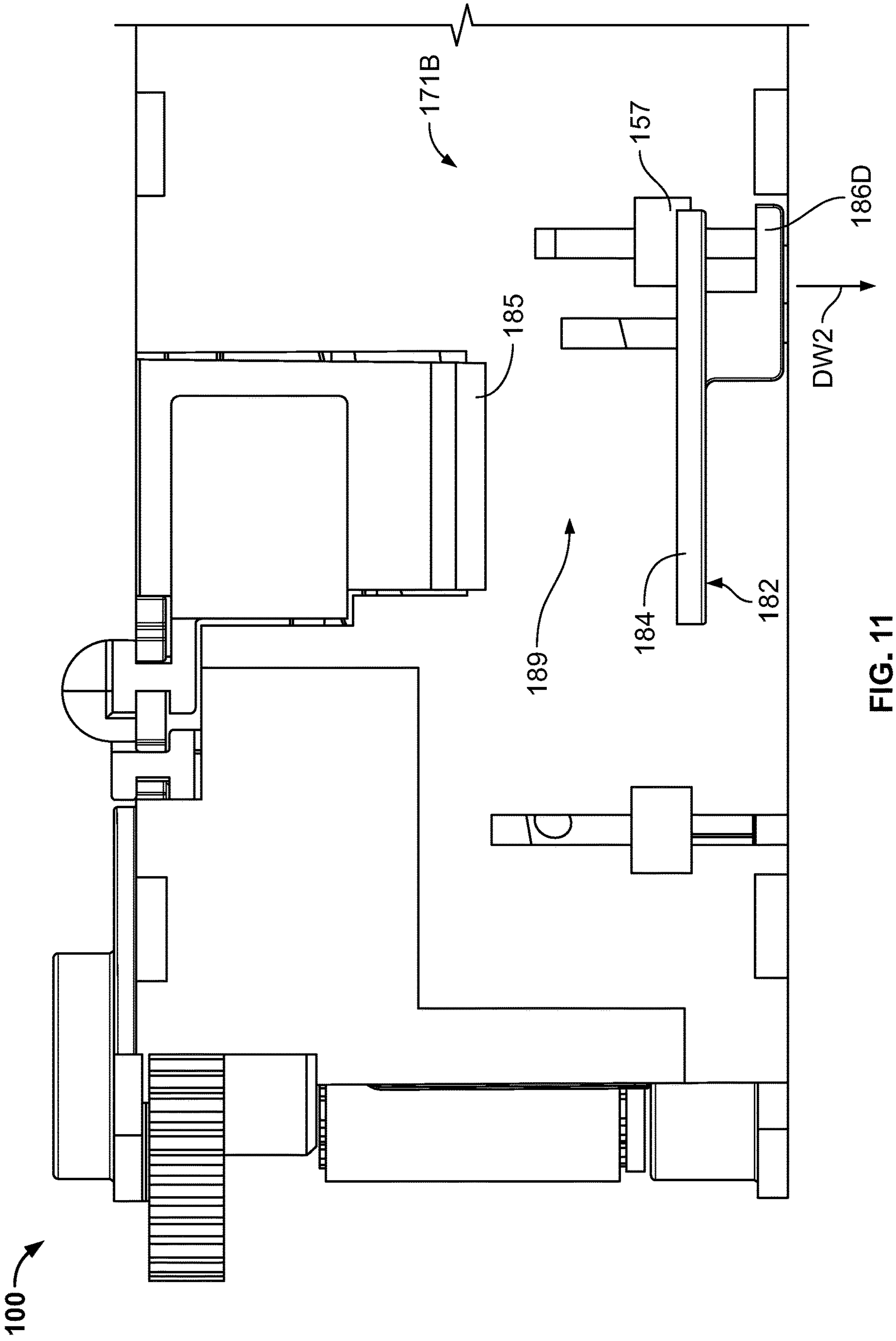

Referring now to FIG. 6, the sizing member 182 includes a clamping wall 184 and an integral mounting portion 186. An integral pusher tab 186D projects rearwardly from the mounting portion 186. The mounting portion 186 is slidably received in the guide slot 187 to permit the sizing member 182 to be selectively slid in an inward direction DW1 and an opposing outward direction DW2 (FIGS. 10 and 11).

The width sizing slot 189 is defined horizontally between the clamping wall 184 and the clamping wall 185. The sizing slot 189 is also bounded by the support wall 183.

The sizing member 182 is installed in its slot 187 adjacent the upstanding mounting feature or head 157 of the baffle 156. The sizing member 182 and the mounting feature are relatively configured and arranged such that when the sizing member 182 is pushed inward (direction DW1) in its guide slot 187, the pusher tab 186D will seat against the head 157 and transfer the force to the baffle 156. The baffle 156 is thereby displaced laterally inward in its slot 118 to the extent the sizing member 182 is displaced inward.

The baffle 156 is mounted in the housing 110 such that the baffle 156 will retain its set position relative to the belt 126 and the stationary baffle 152 until the baffle 156 is deliberately moved by the user. For example, the slots 118 and the mounting features 157 may be relatively sized and configured to provide frictional engagement between the mounting features 157 and the housing 110 sufficient to hold the baffle 156 in position. The tab 186D is not interlocked with the baffle 156, so when the sizing member 182 is pulled outward through its slot 187, the tab 186D slides free of the head 157 and the sizing member 182 does not change the position of the baffle 156.

The width WC (FIG. 12) of the singulating channel 146 (i.e., the lateral spacing between the lower edges 154A, 158A) can be selectively adjusted by sliding the sizing member 182 laterally inward in the slot 187. By sliding the sizing member 172 inward (in direction DW1) (FIG. 10), the width W1 of the width sizing slot 189 is thereby reduced. Additionally, the sizing member 182 pushes the baffle laterally inward (via the tab 186D) so that the adjustable baffle 156 assumes a corresponding more inward position. When the sizing member 182 is thereafter slid laterally outward (in direction DW2) (FIG. 11), the baffle 156 will maintain the inwardmost position to which it was pushed by the sizing member 182.

As discussed below, a sizing article TS (e.g., an exemplary tablet) can be placed in the width sizing slot 189, and the sizing member 182 can then be pushed down to clamp the sizing article TS between the walls 184, 185. In doing so, the baffle 156 is pushed into a position corresponding to the width TW (FIG. 10) of the sizing article TS. The sizing member 182 can then be slid outward (in direction DW2) through its slot 187 and the sizing article TS can then be removed, without changing the position of the baffle 156.

The gate member 162, the height sizing member 172, and the width sizing member 182 may be formed of any suitable material or materials. According to some embodiments, these components are formed of materials as described above for the housing 110.

As can be seen in FIG. 9, the singulating opening 104 is defined by the lower edge 164A of the gate member 162, the end edge 152E of the stationary (left side) baffle 152, the end edge 156E of the adjustable (right side) baffle 156, and the belt engagement surface 129.

Exemplary operation of the dispensing system 10, including more particular operation of the bin 100, will now be described. The bin 100 is filled with tablets T to be dispensed. The tablets T may initially be at rest. At this time, the motor 128 may be at rest so that the belt 126 is not driven.

The operator uses the singulation adjustment system 171 to selectively change and set the dimensions of the singulating channel 146 and the singulating opening 104 so that the width GW and the height Gil of the singulating opening 104 are appropriate for the size and shape of the tablets T in the hopper 112.

For example, for a flat, round pill (i.e., the pill having a greater diameter than thickness) the width GW is set to match the pill diameter plus a desired tolerance to prevent a tablet from rolling through the singulating opening 104. In this case, the height Gil is set to match the pill height plus a desired tolerance to prevent stacked pills from passing through the singulating opening 104.

By way of further example, for an elongate capsule (e.g., having a length greater than its diameter or height and width), the width GW may be set to match the capsule diameter, height or width plus a desired tolerance to prevent capsules from passing through the singulating opening 104 in side-by-side relation. In this case, the height Gil is again set to match the pill height plus a desired tolerance to prevent stacked pills from passing through the singulating opening 104.

In use, in order to adjust the height dimension Gil of the singulation opening 104, the height sizing member 172 is slid up in the guide slot 177 to provide access to the sizing slot 179. The gate member 162 is also slid up in its guide slot 167 to a starting position that is higher than the intended final set position.

A sizing article TS is then placed in the slot between the walls 174, 173. The sizing article TS may be an article having substantially the same shape and dimensions as each of the tablets T in the hopper 112. In some embodiments, the sizing article is one of the tablets T.

The height sizing member 172 is then forced downward in the slot 179 until the wall 174 clamps the sizing article TS between the walls 173, 174 as shown in FIG. 7. In some embodiments, the walls 173, 174 each abut the sizing article TS. The height sizing member 172 also pushes the gate member 162 down from its starting position as described above. When the height sizing member 172 has assumed its full clamping position on the sizing article TS, the gate wall 164 will be at its operational set position (which is lower than the start position) as shown in FIG. 9, thereby setting the singulating opening height GH (FIG. 9).

The height sizing member 172 is then raised as shown in FIG. 8. The sizing article TS is then withdrawn from the slot 179. Notably, when the height sizing member 172 is raised, the gate member 162 remains in its operational set position (FIG. 9) and the height GH remains at its set position.

In use, in order to adjust the width dimension GW of the singulating opening 104, the width sizing member 182 is slid laterally outward (direction DW2) in the guide slot 187 to provide access to the width sizing slot 189. The baffle 156 is also slid outward (direction DW2) in its guide slots 118 to a starting position that is further from the baffle 152 than the intended final set position.

A sizing article TS is then placed in the slot between the walls 184, 185. The sizing article TS may be an article having substantially the same shape and dimensions as each of the tablets T in the hopper 112. In some embodiments, the sizing article TS is one of the tablets T. The sizing article TS may be the same sizing article as used to set the singulating opening height GH.

The width sizing member 182 is then forced laterally inward (direction DW1) in the slot 187 until the wall 184 clamps the sizing article TS between the walls 184, 185 as shown in FIG. 10. In some embodiments, the walls 184, 185 each abut the sizing article TS. The width sizing member 182 also pushes the baffle 156 laterally inward from its starting position as described above. When the width sizing member 182 has assumed its full clamping position on the sizing article TS, the baffle 156 will be at its operational set position as shown in FIG. 12, thereby setting the singulating opening 104 width GW (FIG. 9).

The width sizing member 182 is then slid outward (direction DW2) as shown in FIG. 10. The sizing article TS is then withdrawn from the sizing slot 189. Notably, when the width sizing member 182 is raised, the baffle 156 remains in its operational set position (FIG. 12) and the width GW remains at its set position.

In some embodiments, the dimensions GH, GW of the singulating opening 104 are set and the bin 100 is then inserted in a location in the frame 14 of the dispensing system 10. In other embodiments, the dispensing system 10 is configured to permit adjustment of the dimensions GH, GW with the bin 100 installed in the frame 14.

With the singulating opening 104 dimensions GH, GW set as described above and the bin 100 installed in the appropriate location in the frame 14, the dispensing carrier 26, directed by the controller 12, moves the container C to the outlet 119 of the selected dispensing bin 100. Once the container C is properly positioned, the controller 132 actuates the motor 128 to drive the belt 126 in the forward direction BF (FIG. 5). In some embodiments or operations, the controller 132 first actuates the motor 128 to drive the belt in the reverse direction BR to pre-clear the dispensing channel singulating area, before driving the belt 126 in the forward direction BF to dispense.

The tablets T stored in the hopper chamber 114 gravity feed progressively through the opening 114A to the staging area 117A. The bin 100 may be provided with a feed control system 115 (FIG. 5) including a driven feed wheel 115A and a control flap 115B corresponding to the feed control system, driven feed wheel, and control flap disclosed in U.S. Pat. No. 9,296,545 to Daniels et al. (the disclosure of which is incorporated herein by reference). The feed wheel 115A may be driven by an electric motor, for example. As discussed in U.S. Pat. No. 9,296,545, the feed control system 115 can regulate the flow of tablets T from the hopper chamber 114 to the staging area 117A. The feed control system 115 can reduce or prevent the flow of excess tablets and thereby prevent tablet jamming downstream on the belt 126. At the staging area 117A, the tablets T slide or fall onto the belt engagement surface 129 on or near the take up end 126C. Each deposited tablet T is conveyed or transported forward by the drive belt 126 in a dispensing or forward direction TF along the dispensing path P through the singulating channel 146 and the singulating opening 104 to the waiting container C.

In some embodiments, the belt 126 is vibrated to agitate the tablets T on the belt 126, and thereby reduce clumping and promote singulation of the tablets T. In some embodiments, the bin 100 includes an integral agitation mechanism to vibrate the belt 126 and agitate the tablets T in this manner. Suitable agitation mechanisms may include a tablet agitation mechanism that includes belt vibration as described in U.S. Pat. No. 9,296,545, for example.

The photodetector 134A detects the tablets T as they pass thereby along the dispensing path P.

In order to present the dispensed tablets T to the photodetector 134A sequentially so that the tablets T can be accurately counted, the bin 100 singulates the dispensed tablets T upstream of the photodetector 134A. As used herein, "singulate" (and variations thereof) means that the tablets T (or other articles) are re-arranged into one-by-one serial order (i.e., single file order). The tablets T are sequenced or singulated, and may be oriented into a preferred orientation, by the shape of the singulating channel 146, the shapes of the baffles 152, 156, the shape of the singulating opening 104, and/or the action, configuration and/or properties of the belt 126. More particularly, as the belt 126 picks up the tablets T at its end 126C and draws them through the narrow singulating channel 146, the conveyed tablets T will tend to align sequentially along the length of the belt engagement surface 129. The curved baffle walls 152, 156 will also tend to direct or reshuffle the tablets in and entering the singulating channel 146 into a singulated series of tablets. In the event a tablet T is not suitably singulated or aligned by the time it reaches the singulating opening 104, the gate wall 164 can serve to singulate the tablet or, failing that, block the tablet from proceeding.

According to some embodiments, the exposed section 129 is substantially planar and lies in a plane B-B (FIG. 15) across substantially its full length and width. Thus, the conveyed tablets T will ride on the engagement surface on the plane B and will not sink into or fall into cavities in the belt 126.

In some embodiments, the height adjustment mechanism 171A is configured such that the set height GH is equal to the height TH (FIG. 7) of the sizing article TS plus a prescribed tolerance height. In some embodiments, the width adjustment mechanism 171B is configured such that the set width GW is equal to the width TW (FIG. 10) of the sizing article TS plus a prescribed tolerance width. In some embodiments, the tolerance height and the tolerance width are each in the range of from about 7% to 15% of the corresponding dimension of the sizing article TS (i.e., the height GH of the singulating opening 104 is in the range of from about 7% to 15% greater than the height TH of the sizing article TS, and the width GW of the singulating opening 104 is in the range of from about 7% to 15% greater than the width TW of the sizing article TS).

According to some embodiments, the length of the belt engagement section 129 is at least 5 inches and in some embodiments, is in the range of from about 5 to 8 inches.

Once dispensing is complete (i.e., a predetermined number of tablets have been dispensed and counted), the controller 132 will initiate a reverse mode and reverse the drive direction of the motor 128 to drive the belt 126 and the belt engagement surface in a reverse direction BR (FIG. 5). In this manner, any tablets T remaining in the singulating channel 146 on the belt 126 are returned in a reverse direction TR toward the hopper chamber 114 and the staging area 117A under the drive force of the reversed belt 126.

During a dispensing cycle (i.e., when the belt 126 is being driven in the forward direction BF), the controller 132 may determine that a tablet jam condition is or may be present. A tablet jam is a condition wherein one or more tablets are caught up in the bin 100 such that tablets T will not feed into or through the singulating opening 104 under the influence of the drive belt 126. Tablets may form a jam at the singulating opening 104 or elsewhere so that no tablets are sensed passing through the outlet 119 for a prescribed period of time while the belt 126 is being driven forward. When a tablet jam is identified by the controller 132, the controller 132 will issue a "jam clear" to clear a perceived tablet jam. In the jam clear mode, the controller 132 will drive the belt 126 in the reverse direction BR as discussed above. The reverse driven belt 126 may serve to dislodge any such jams as well as to loosen the tablets in the hopper chamber 114.

Typically, an operator will request that a desired number of tablets be dispensed ("the requested count"). The sensor system can detect the tablets T as they pass through predetermined points along the dispensing path P. The controller 132 may use the detection signals from the photodetectors to monitor and maintain a registered count of the tablets T dispensed ("the system count"). When the system count matches the requested count, the controller 132 will deem the dispensing complete and cease dispensing of the tablets T. In some embodiments, the controller 132 will slow down the speed of the belt 126 near the end of the count to ensure accuracy.

Several aspects of the bin 100 facilitate accurate, consistent and convenient singulation of the tablets. The opposed baffles 152, 156 define a nonlinear singulating channel 146 extending from an inlet (at the take up end 126C of the belt 126) to an outlet (proximate the drop off end 126D of the belt 126 and the bin outlet 119). As will be appreciated from the drawing, the singulating channel 146 has a relatively wide receiving section 146A that collects and funnels tablets T from the hopper into a relatively narrow singulating section 146B as the tablets T are conveyed through the dispensing channel 140. The singulating section 146B follows an arcuate, curved or zig-zag path that assists in desirably singulating and orienting the tablets T.

The overhang of the first inner engagement surface 154 over the singulating channel 146 assists in directing the conveyed tablets T to lay flat and assume a single file configuration. The first inner engagement surface 154 can prevent tablet stacking and can knock upstanding tablets T down and push stacked tablets T off of underlying tablets T.

The deflector nub 156N can assist in funneling the tablets to the singulating opening 104 in the appropriate or prescribed orientation. In particular, in the event that a misoriented tablet T approaches the singulating opening 104, the redirector feature will tend to rotate or reorient the tablet into axial alignment with the singulating opening 104 so that the tablet T can pass through the singulating opening 104. In other embodiments, the deflector nub 156N may form a part of (i.e., be integral with) the baffle 152 instead of the baffle 156.

At the singulating opening 104, the tablets T are singulated so that the tablets T pass one at a time through the singulating opening 104. Singulating the tablets in this manner can improve reliability and accuracy in detecting and counting the dispensed tablets T.

In order to properly singulate the tablets T, the singulating channel 146 and the singulating opening 104 should each have a width that is close the width of the tablets being dispensed. Likewise, the singulating opening 104 should have a height that is close to the height of the tablets being dispensed. Therefore, it is important to adjust these widths and height properly for the tablets being dispensed.

The height adjustment mechanism 171A and the width adjustment mechanism 171B provide accurate, reliable and convenient mechanisms to set the dimensions of the singulating opening 104. The mechanisms 171A, 171B each permit the sizing article to be removed, after it has been used to set a dimension, without disturbing or changing the operational set position of the gate member 162 or the baffle 156.

Bins as disclosed herein can be used in dispensing systems of any suitable type or design. For example, the bins of the present invention can be used in semi-automated or "instant access" systems. According to some embodiments, a bin according to embodiments of the invention (e.g., the bin 100) is a direct replacement for and is installed in place of an air driven dispensing bin such as disclosed in U.S. Pat. No. 7,837,061 to Dummer, U.S. Published Patent Application No. 2009/0294464 to Michelli et al., U.S. Pat. No. 7,263,411 to Shows et al., U.S. Pat. No. 7,014,063 to Shows et al., and U.S. Published Patent Application No. 2009/0043421 to Parrish et al.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A dispensing apparatus for dispensing articles, the dispensing apparatus comprising:
- a dispensing outlet;
- laterally opposed first and second inner engagement surfaces, wherein the first and second inner engagement surfaces are elongate and define a singulating channel therebetween;
- a dispensing path extending through the singulating channel to the dispensing outlet; and
- a drive system including:
  - a belt including a belt surface defining a belt plane; and
  - a belt actuator operable to drive the belt;
- wherein the dispensing apparatus is configured to convey articles on the belt in a dispensing direction along the dispensing path toward the dispensing outlet to be dispensed;
- wherein the singulating channel is configured to singulate the articles as the articles are conveyed along the dispensing path and through the singulating channel toward the dispensing outlet to be dispensed; and
- wherein the first inner engagement surface extends laterally across a portion of the singulating channel and is tilted at an oblique angle to the belt plane such that the first inner engagement surface overhangs at least a portion of the singulating channel and a normal of the first inner engagement surface is inclined downward, to engage articles conveyed along the singulating channel.

2. The dispensing apparatus of claim 1 wherein the oblique angle is in the range of from about 8 to 12 degrees.

3. The dispensing apparatus of claim 1 wherein:
- the first inner engagement surface is longitudinally nonlinear; and
- the singulating channel is longitudinally nonlinear.

4. The dispensing apparatus of claim 3 wherein:
- the first inner engagement surface is longitudinally arcuate; and
- the singulating channel is longitudinally arcuate.

5. The dispensing apparatus of claim 1 wherein the second inner engagement surface extends laterally away from the first inner engagement surface at a second oblique angle to the belt plane.

6. The dispensing apparatus of claim 5 wherein the second oblique angle is in the range of from about 43 to 47 degrees.

7. The dispensing apparatus of claim 1 wherein at least one of the first and second inner engagement surfaces is movable relative to the other to selectively adjust a width dimension of the singulating channel.

8. The dispensing apparatus of claim 7 including:
- a first baffle including the first inner engagement surface; and
- a second baffle including the second inner engagement surface.

9. The dispensing apparatus of claim 1 including a deflector nub that projects laterally inwardly from the first inner engagement surface or the second inner engagement surface.

10. The dispensing apparatus of claim 1, wherein:
- the singulating channel includes a singulating section and a receiving section;
- the singulating section is located between the receiving section and the dispensing outlet; and
- the receiving section is wider than the singulating section.

11. The dispensing apparatus of claim 1 including a singulating gate system including a singulating gate member positioned over the belt and configured to define a singulating opening along the singulating channel or at an outlet end of the singulating channel.

12. The dispensing apparatus of claim 11 wherein the singulating gate member, the first inner engagement surface, and the second inner engagement surface collectively define the singulating opening.

13. The dispensing apparatus of claim 12 wherein:
- the singulating gate member is movable relative to the belt to selectively adjust a height of the singulating opening; and
- at least one of the first and second inner engagement surfaces is movable relative to the other to selectively adjust a width dimension of the singulating opening.

14. The dispensing apparatus of claim 1 including:
- a housing including:
  - a hopper chamber to hold the articles;
  - the dispensing outlet;
  - the singulating channel; and
  - the dispensing path, wherein the dispensing path extends between the hopper chamber and the dispensing outlet and through the singulating channel;
- wherein the dispensing apparatus is configured such that articles disposed in the hopper chamber are directed onto the belt and the belt, when driven by the belt actuator, conveys the articles received from the hopper chamber in the dispensing direction along the dispensing path toward the dispensing outlet to be dispensed.

15. The dispensing apparatus of claim 1 wherein the dispensing apparatus is operable to selectively drive the belt in a reverse direction to convey the articles along the dispensing path away from the dispensing outlet.

16. The dispensing apparatus of claim 1 including a singulation adjustment system including an article sizing member that is:
- movable to clamp a sizing article to thereby set a dimension of the singulating channel corresponding to a dimension of the sizing article; and
- thereafter movable to release the sizing article, whereupon the set dimension of the singulating channel is retained.

17. The dispensing apparatus of claim 1 wherein the first inner engagement surface is tilted at an oblique angle to vertical.

18. The dispensing apparatus of claim 1 wherein the first inner engagement surface faces the belt surface.

19. A method for dispensing articles, the method comprising:

providing a dispensing apparatus including:

a dispensing outlet;

laterally opposed first and second inner engagement surfaces, wherein the first and second inner engagement surfaces are elongate and define a singulating channel therebetween;

a dispensing path extending through the singulating channel to the dispensing outlet; and a drive system including:

a belt including a belt surface defining a belt plane; and a belt actuator operable to drive the belt; and dispensing articles, including driving the belt using the belt actuator to convey articles on the belt in a dispensing direction along the dispensing path toward the dispensing outlet to be dispensed;

wherein the singulating channel singulates the articles as the articles are conveyed along the dispensing path and through the singulating channel toward the dispensing outlet to be dispensed; and wherein the first inner engagement surface extends laterally across a portion of the singulating channel and is tilted at an oblique angle to the belt plane such that the first inner engagement surface overhangs at least a portion of the singulating channel and a normal of the first inner engagement surface is inclined downward, and the first inner engagement surface engages articles conveyed along the singulating channel.

* * * * *